(12) United States Patent
Suhami

(10) Patent No.: US 8,543,061 B2
(45) Date of Patent: Sep. 24, 2013

(54) CELLPHONE MANAGED HEARING EYEGLASSES

(75) Inventor: Avraham Suhami, Petah Tikva (IL)

(73) Assignee: Suhami Associates ltd, Petah Tikva (IL)

( * ) Notice: Subject to any disclaimer, the term of this patent is extended or adjusted under 35 U.S.C. 154(b) by 0 days.

(21) Appl. No.: 13/430,728

(22) Filed: Mar. 27, 2012

(65) Prior Publication Data

US 2012/0282976 A1 Nov. 8, 2012

Related U.S. Application Data

(60) Provisional application No. 61/482,000, filed on May 3, 2011.

(51) Int. Cl.
- *H04B 7/00* (2006.01)
- *H04M 1/00* (2006.01)
- *H04R 25/00* (2006.01)
- *G10K 11/16* (2006.01)
- *H03B 29/00* (2006.01)

(52) U.S. Cl.
USPC ...... 455/41.3; 455/66.1; 455/575.2; 381/313; 381/330; 381/71.6

(58) Field of Classification Search
USPC ............... 455/41.1, 41.2, 41.3, 66.1, 550.1, 455/556.1, 569.1, 575.2, 575.6; 381/312, 381/313, 322, 330, 71.1, 71.6
See application file for complete search history.

(56) References Cited

U.S. PATENT DOCUMENTS

| | | | |
|---|---|---|---|
| 4,700,394 A | 10/1987 | Selbach | |
| 4,773,095 A | 9/1988 | Zwicker | |
| 5,649,055 A | 7/1997 | Gupta | |
| 6,130,945 A | 10/2000 | Shin | |
| 6,674,868 B1 | 1/2004 | Narusawa | |
| 6,801,889 B2 | 10/2004 | Walker | |
| 6,813,490 B1 | 11/2004 | Lang | |
| 6,914,996 B2 | 7/2005 | Takeda | |
| 7,013,009 B2 | 3/2006 | Warren | |
| 7,031,483 B2 | 4/2006 | Boone | |
| 7,079,876 B2 | 7/2006 | Levy | |
| 7,103,192 B2 | 9/2006 | Bailey | |
| 7,192,136 B2 | 3/2007 | Howell | |
| 7,328,048 B2 | 2/2008 | Levy | |
| 7,460,677 B1 | 12/2008 | Soede | |
| 7,500,747 B2 | 3/2009 | Howell | |
| 7,529,545 B2 | 5/2009 | Rader | |
| 7,555,136 B2 * | 6/2009 | Wang | 381/380 |
| 7,609,842 B2 | 10/2009 | Sipkema | |
| 7,676,046 B1 | 3/2010 | Nelson | |
| 7,680,465 B2 | 3/2010 | Zad-Issa | |
| 7,760,898 B2 | 7/2010 | Howell | |
| 7,792,552 B2 | 9/2010 | Thomas | |
| 7,806,525 B2 | 10/2010 | Howell | |
| 7,931,367 B2 | 4/2011 | Jackson | |
| 7,967,433 B2 | 6/2011 | Jannard | |
| 7,988,283 B2 | 8/2011 | Jannard | |

(Continued)

*Primary Examiner* — Nguyen Vo

(57) ABSTRACT

The invention describes a Hearing Aid device composed of a cellphone and eyeglasses where some of the programs are carried out by components embedded onto the temples of eyeglasses and some programs by components which are inherently part of cellphones. The combined device improves the intelligibility of voice messages arriving both through the cellphone speaker, the connected earphones and directly through the free air. The user can call diverse programs suitable for different situations, by using inertial sensors embedded either in the eyeglasses or are inherently part of the cellphone.

19 Claims, 13 Drawing Sheets

(56) References Cited

U.S. PATENT DOCUMENTS

| | | |
|---|---|---|
| 8,010,156 B2 | 8/2011 | Warren |
| 8,011,783 B1 * | 9/2011 | LeBlang .................. 351/158 |
| 8,020,989 B2 | 9/2011 | Jannard |
| 8,085,960 B2 | 12/2011 | Alfsmann |
| 8,139,801 B2 | 3/2012 | Sipkema |
| 8,351,636 B2 * | 1/2013 | Ritter et al. .................. 381/381 |
| 2004/0161128 A1 | 8/2004 | Narusawa |
| 2005/0091043 A1 | 4/2005 | Narusawa |
| 2005/0135644 A1 | 6/2005 | Qi |
| 2006/0287859 A1 | 12/2006 | Hetherington et al. |
| 2010/0119093 A1 | 5/2010 | Uzuanis et al. |
| 2011/0051982 A1 * | 3/2011 | Abreu .......................... 381/384 |

* cited by examiner

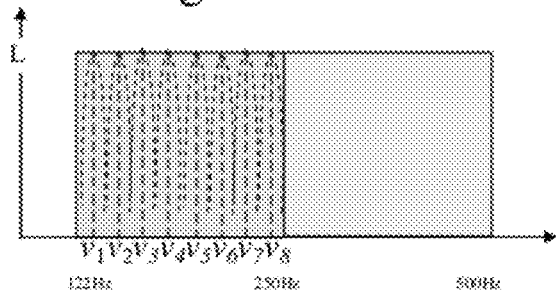
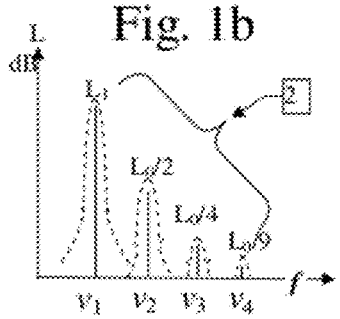
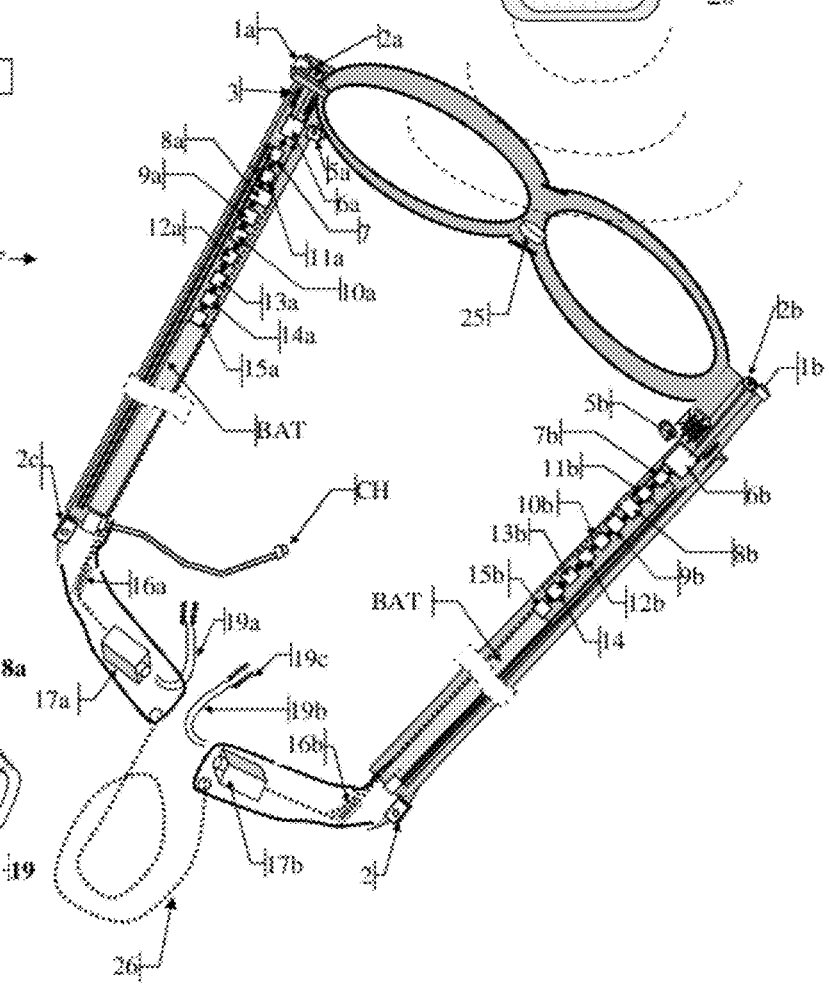

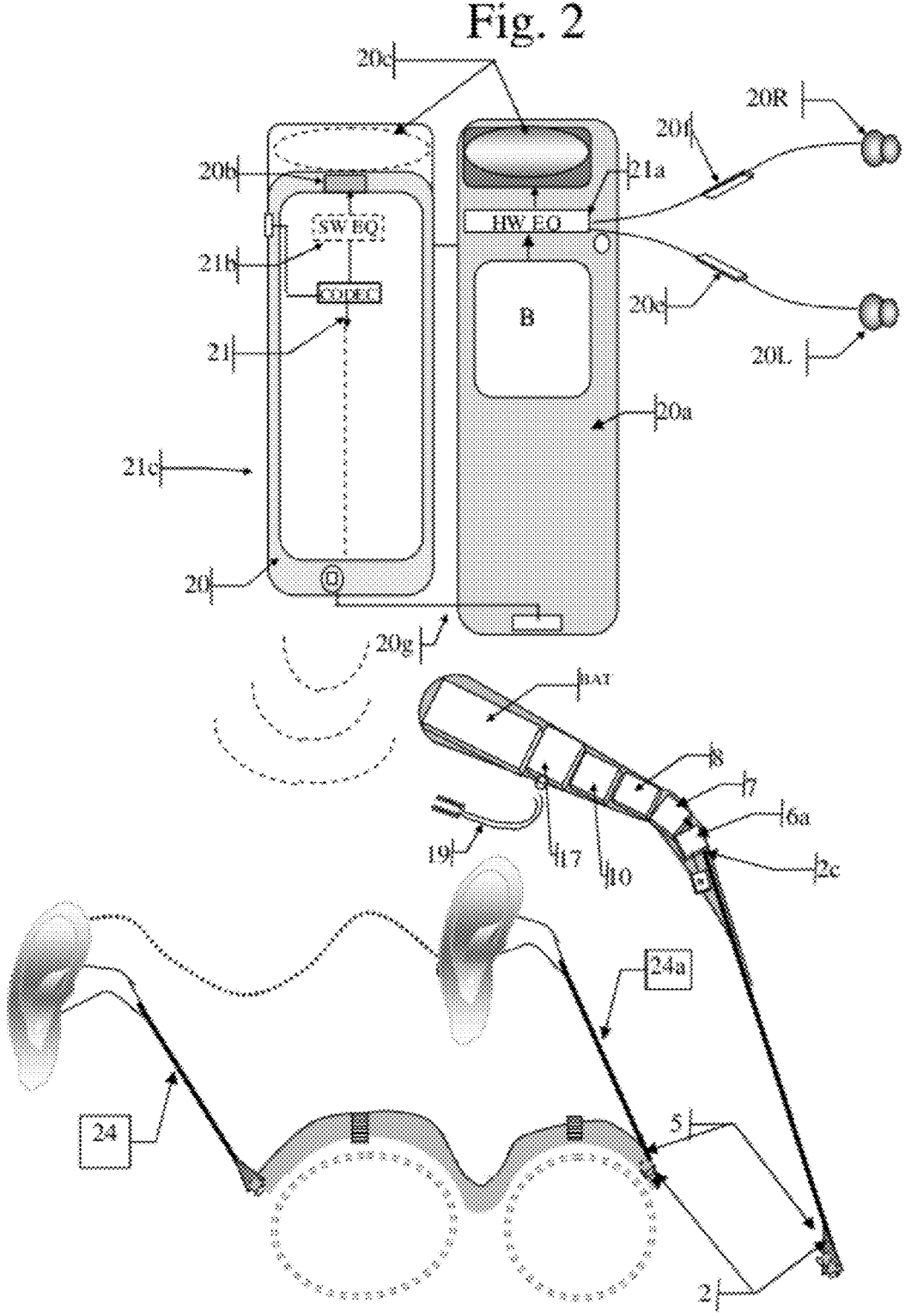

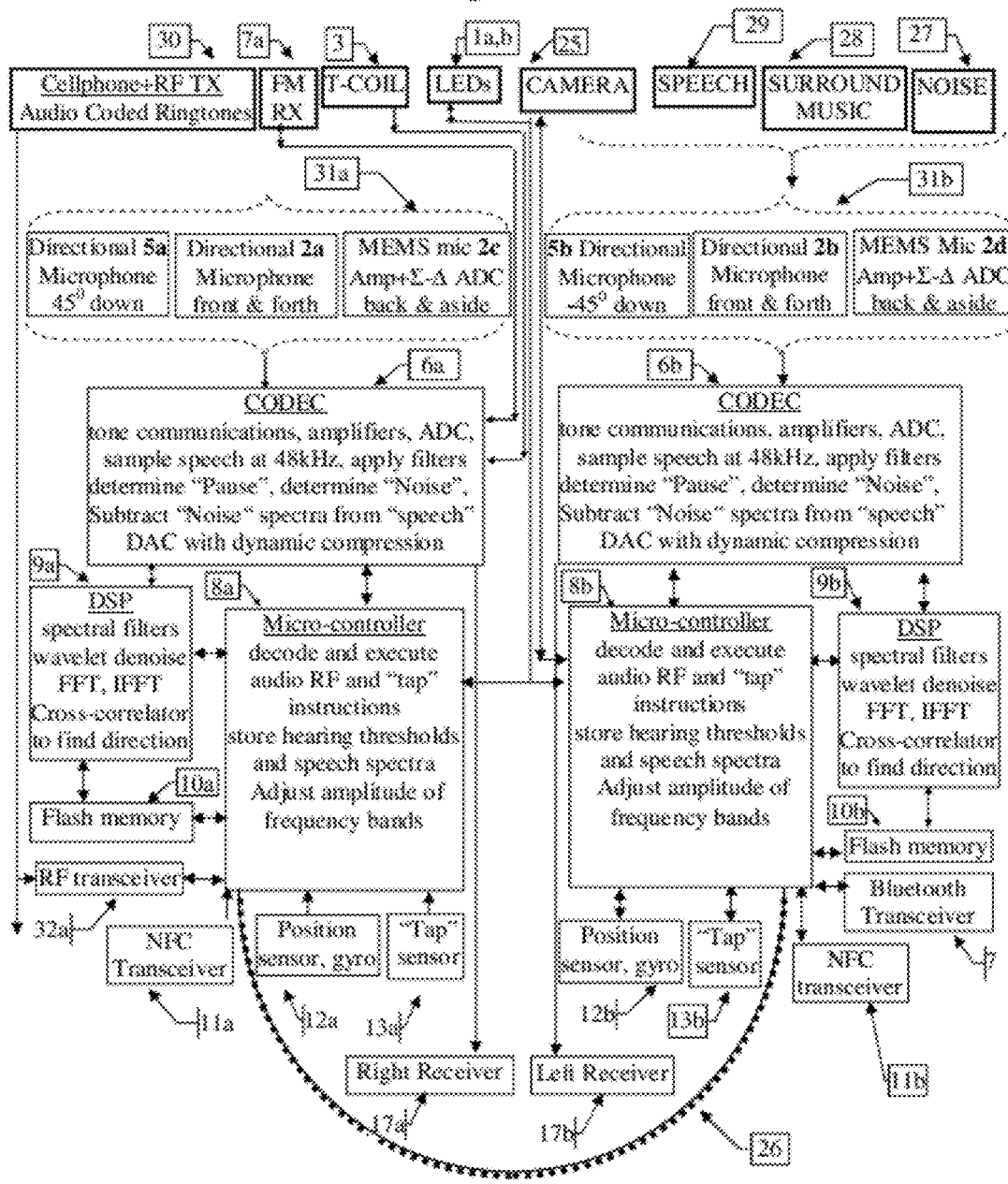

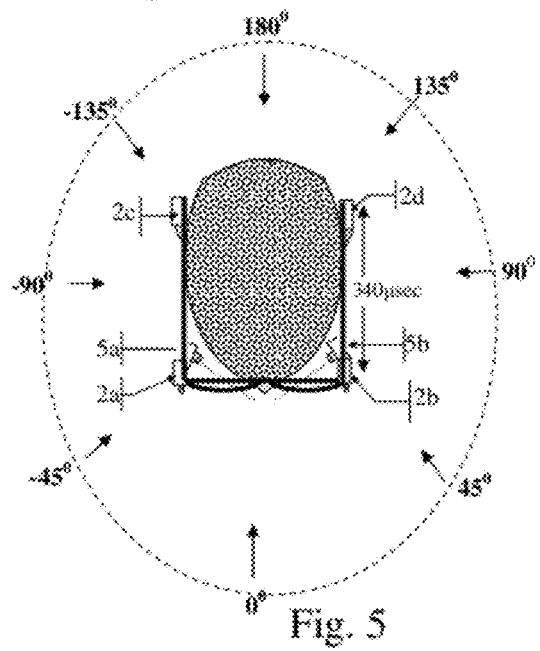
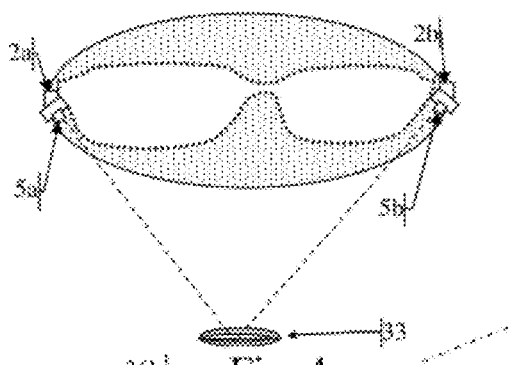
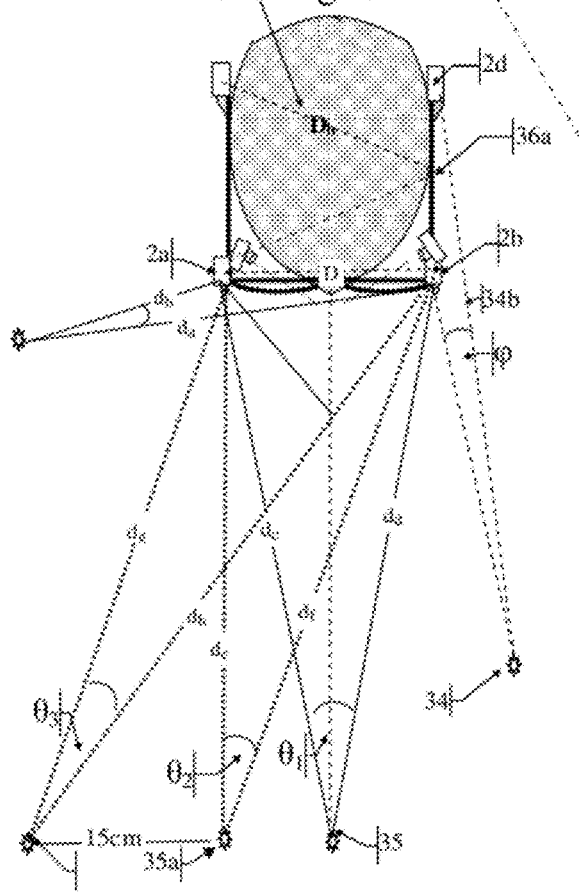
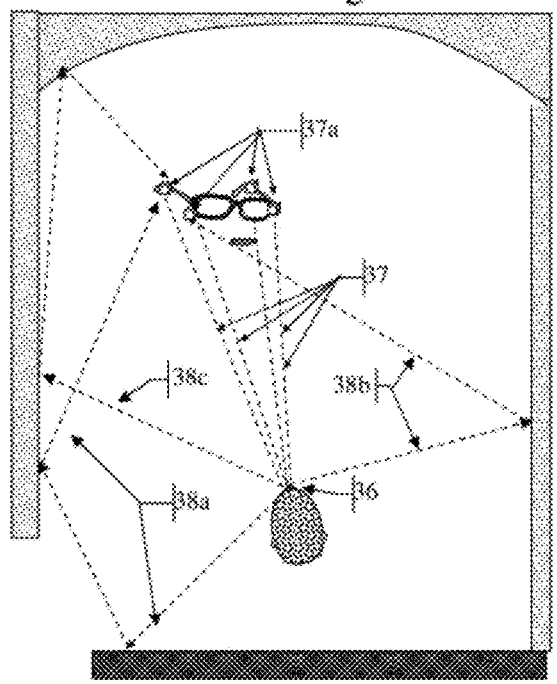

Fig. 10
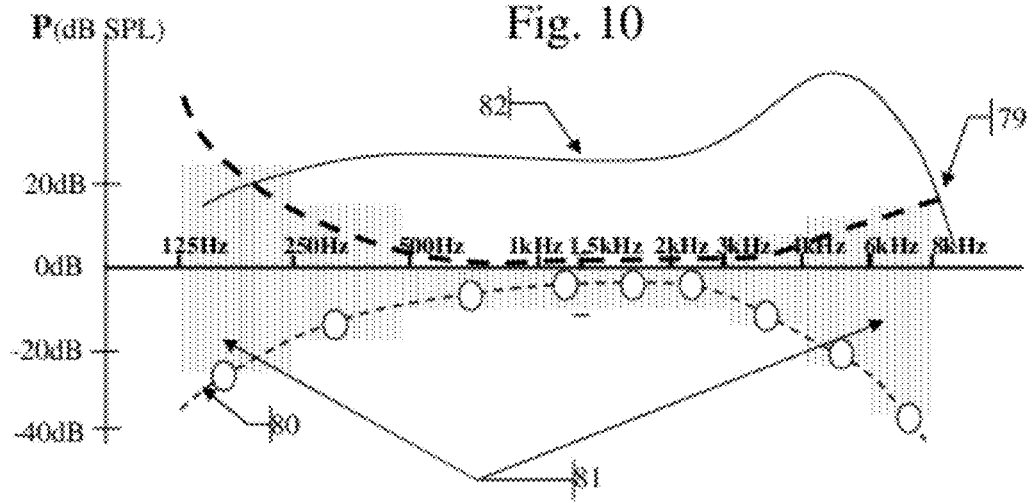
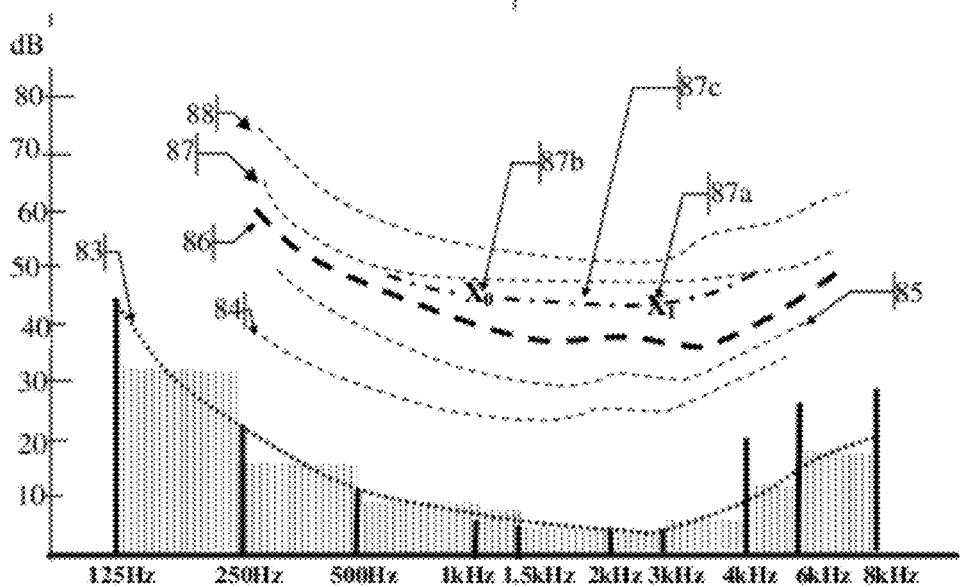
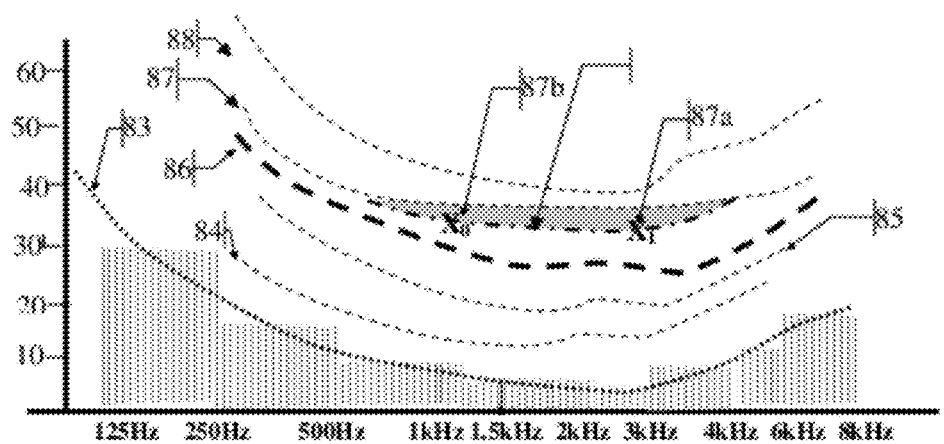

CELLPHONE MANAGED HEARING EYEGLASSES

This application claims the benefit of U.S. Provisional Patent application 61/482,000 filed on May 3, 2011 titled "Remote Managed Hearing Eyeglasses" incorporated herein its entirety by reference.

BACKGROUND

A Hearing Aid enhances hearing by amplifying voices detected by a sensitive microphone, while bringing an individual's reduced hearing response at various audible frequencies, to the level of hearing of a normal person, which is defined roughly as the ability to hear sounds on an absolute scale of 0 to 25 dB. The modified sound is then delivered into the user's ear canal.

Hearing Aids also use various algorithms to suppress noise, echo and eliminate receiver-to-microphone acoustic feedback.

Hearing devices may be situated behind-the-ear (BTE), in-the-ear (ITE) or completely-in-the-ear canal, (CIC).

In recent years the use of cellphones in relaying voice messages from one person to another has increased enormously. The advent of cellular phones has caused many problems for the hearing impaired people wearing one of the hearing aids in or behind the ear, starting from the electromagnetic interferences between the two devices that are in close distance one from the other and the physical encumbrance caused by placing the cellphone over the hearing aid. Several solutions to these problems have been devised, including the use of inductive communication between the cellphone and the hearing aid device through the use of telecoils or resolving the causes of interferences. However to the best of our knowledge no radical solution to the hearing impaired people in the cellular phone age has been suggested nor implemented.

One of the technological problems of the (BTE), (ITE) or (CIC) type hearing aids is the determination of the direction of the sound reaching the ear; precise determination of the direction of sound enables to eliminate unwanted sources of sound and greatly improve SNR. This problem is currently dealt by using directional microphones that alleviate the problem (see U.S. Pat. No. 3,770,911). Some previous art solutions have suggested using two microphones and measuring the phase delay between them for determining the sound direction, however if the two microphones are very close the determined direction is not accurate. There have been several applications to put several microphones on the eyeglasses temples (see U.S. Pat. No. 3,247,330, U.S. Pat. No. 4,773,095; U.S. Pat. No. 7,192,136; U.S. Pat. Nos. 7,031,483; 7,609,842, 20090252360) for finding the direction of sounds however the technological implementations of these devices have been unsuccessful. There are also no cellphones that, working collaboratively with "hearing eyeglasses", eliminate unwanted directional or non-directional sound.

SUMMARY OF THE INVENTION

The invention describes a Hearing Aid device composed of a cellphone and eyeglasses where some of the programs are carried out by components embedded onto the temples of eyeglasses and some programs by components which are inherently part of cellphones. The combined device improves the intelligibility of voice messages arriving both through the cellphone speaker, the connected earphones and directly through the free air. The user can call diverse programs suitable for different situations, by using inertial sensors embedded either in the eyeglasses or are inherently part of the cellphone.

It has to be realized that the core architecture of the classical hearing aid is to detect voice, "correct" it, and deliver it to the ear of the hearing impaired person.

A cellphone, in principle can do all these functions, with some reservation though. It can detect voice, directly or through the cellular network, it can determine interactively with the hearing impaired person his hearing profile, it has the computing power to "boost" certain intensities, and eliminate certain sources of noise and when its speaker is juxtaposed to the ear, it can deliver the "corrected" sound to the ear of the hearing impaired person.

There are things that the cellphone cannot do though. In its current architecture, it cannot differentiate between directional sound and surround sound and eliminate unwanted sound and mainly, it cannot be worn all the day connected to the ear.

Here is where the eyeglasses come. They can be worn inconspicuously all the time, and components embedded on its temples may carry out many of the functions that neither the cellular phone nor the miniscule behind or in the ear hearing aids can. In fact it can also replace many of the functions of the cellular phone.

The design of the device presented in this application goes half way.

It comprises a cellphone in its current architecture and eyeglasses where electronic sensors, processors, device conditioners and transceivers are embedded on its temples and can interact with the cellphone through its ports using coded audio instructions. Together they provide to a hearing impaired person, hearing loss corrected speech and sound, arriving either directly or by wireless communications.

Hearing impaired people communicate with other people directly or using line and wireless communication devices, telephones and cellphones. Intelligibility of a received message is conditional to a faithful reconstruction of the parts of the message that are missing, due to the hearing losses. Amplifying the received message across the board, at all frequencies, is the basic tool that improves intelligibility. When the hearing losses are minimal, amplification may be sufficient. However amplifying both relevant speech and noise may not achieve much. Therefore reduction noise as much as possible is the next goal. In our system we try to substantially eliminate noise using two strategies. One strategy is by letting the hearing impaired person, to limit his "listening cone" to cover only the space covered by his interlocutor(s). If the noise is omnidirectional, this tool by itself will reduce noise by up to two orders of magnitude. If the noise, on the other hand, is coming from the same direction as his interlocutor, this strategy may not achieve much. Setting a "listening code" requires at least 4 microphones around the head of the person; consequently this strategy requires to place the microphones on the eyeglasses worn by the user. To increase the accuracy of the limited listening code and the ability to change it quickly in real time, powerful DSPs, that continuously compute cross-correlations between the various microphones, are installed on both temples of the eyeglasses.

The second strategy we use for reducing noise, is to follow speech components in time with a time resolution of 1-2 milliseconds and try to locate the natural "pauses" between phonemes, syllables and words. As noise is, with high degree of probability, present both during "pauses" and during speech segments, subtracting the noise frequencies amplitudes from the following speech frequencies, improves the SNR during speech. This strategy is applicable both to the sound detected by the microphones situated on the eyeglasses temples as it is applicable to the microphone of the cellular phone. The cellphone controls the processors on the temples by emitting high frequency audio instructions in the form of ringtones not heard by most persons.

The next tool we have, in our endeavour to improve intelligibility of the detected speech is to compensate for the loss of hearing of selected audio notes, mostly at low and high frequencies at each ear. These losses may be measured by the user himself using his cellphone, and the required amplifications at selected frequencies, applied both to the speech detected by the microphones situated on the eyeglasses and at the incoming calls by wireless, before being sent to the respective left and right speakers of the eyeglasses and the cellphone speaker and earphones.

Next, it is essential to differentiate between the voice of the user and that of other people in order to refrain from amplifying the user's voice and sending it to the respective speakers, thereby starting a regenerative audio loop. This identification of the user's voice may be achieved by cross-correlating the voice segments detected by the microphones at the two opposite sides of the mouth and eliminating those voice segments that are fully correlated. In addition the voice segments detected by the microphones of the eyeglasses or the cellphone, may be compared to the preloaded voice signature of the user, where high correlation approves the identity of the user and therefore are prevented to reach the respective speakers.

Current Hearing Aid devices, suffer from deficiencies some of which are due to the limited space of several $cm^3$, into which all the components, including the microphone, the receiver and the batteries, have to be squeezed in. An example is trying to find the direction of sound with two microphones that are 1 cm apart. The limited space, also dictates the use of power-limited data processors that are not powerful enough to perform complex comparisons fast enough.

In this context it is important to stress the need to process speech rapidly, in order to combine it with speech arriving directly to the ear through the free air, so that the ear will seamlessly integrate the two. Digital hearing loss compensation comprising spectral decomposition with filters, non-linear amplification depending on the hearing threshold and spectral reconstruction ought to be carried out preferably in milliseconds or less, in order to enable the audio signals emitted by the receiver to be integrated with the sound reaching the ear directly through free air, without much delay.

The noise subtraction schemes should also abide by the same constraint of speed; they should be able to define and subtract "noise" from speech, preferably within several milliseconds from the detection by the microphone of said sound wavefront. This kind of quick reaction requires fast and powerful 32 bit DSPs that are hard to squeeze into the miniscule behind-the-ear hearing aids. RF Transceivers embedded on the eyeglasses enable two way communications with the digital world and communication between the temples of the eyeglasses.

Consequently placing the required powerful DSPs and batteries much larger than the miniscule Zn-air batteries, on the eyeglasses temples, is a major advantage.

Current "Hearing Aids" are individualized devices optimized for certain situations by different programs. Change of programs need professional adjustments, requiring frequent visits to the hearing clinic. In this context too, the ability to change programs using the cellphone is a major advantage.

We also maintain that there is no single solution to hearing impairment. The various situations encountered with different interlocutors and/or sound sources in different locations, are hard to accommodate with one "ingenious" device. Detecting automatically, the various situations and allocations and maximizing Speech intelligibility accordingly although feasible, is not part of the functionality of the current invention. Different programs are needed to maximize speech intelligibility, in a quiet or noisy room of different sizes, in a Park or in a concert hall. One-on-one dialog is different from Listening to everyone talking at the same time in a meeting. Listening to music at home is different than Listening in a concert hall. Given the breadth of situations, our system opted for letting the user to make the selection between programs, depending on the situation he is in. In our architecture change of programs is done by the user, using his cellular phone by emitting the proper instruction using coded ringtones detected by the microphones embedded on the eyeglasses frames. Some functions like selecting the apertures of the "Listening cone" may be executed with a number of "taps" on the "tap" sensors located on both temples. The selection is then acknowledged by a short message delivered through the receiver of the hearing aid. Large memories are placed on each temple of the eyeglasses to accommodate programs that best satisfy the various situations.

The Ringtones emitted by the user's cellphone serve a dual purpose, to generate bands of tones of different pitch and timbre of varying intensities for determining the threshold of hearing, and also generate sequences of sounds for controlling the various functions of the system. The coded audio instructions embedded into Ringtones when detected by the microphones of the eyeglasses or that of the cellphone are interpreted by the embedded microcontrollers which then instruct to execute the various functions. A side advantage of relaying instructions to the system by audio is that some people may also relay instructions by just "whistling" from a distant location. External commands may also be transmitted by the wireless Bluetooth transceiver of the cellphone and detected by the Bluetooth transceiver installed on the eyeglasses.

The ability to record his own hearing responses, using his cellphone Ringtones, enables the user to do so in real life situations, which is very different from determining a threshold of hearing using pure tones delivered through earphones in a booth of an audio clinic.

In this context it is important to realize that the "structure" of the ear changes the spectrum of the sound reaching the inner ear; while higher frequencies are amplified, the lower ones are weakened. Moreover these changes are dependent on the direction of the sound reaching the ear. Consequently, it has to be realized that the "hearing threshold" measured in the audio clinic with pure tones, is only a first approximation when it comes to improve the hearing ability in real life situations, where sounds arrive from different directions. The correction implemented in hearing aids usually consists in amplifying the various frequencies in different amounts, given the "hearing threshold" measured in the clinic, so that the resultant frequency response is that of a "normal person". We maintain that this procedure is grossly incorrect; the correction should be different when for example the sound is coming from someone in front of you, from the side or from a "surround sound" system with 6 loudspeakers in a room.

Another aspect of defining a suitable "threshold of hearing" is the intelligibility aspect, which takes in account the brain perception of speech. A person will "hear" a sound's higher harmonics although he may not hear the fundamental frequency and will substitute the unheard frequency in trying to decode a word that should have contained the unheard or unresolved frequency. This substitution will help the brain "understand" the word.

An additional aspect of measuring the "hearing threshold" is the "masking" effect, where a note at certain frequency may be masked from being "heard" if another note at a near frequency but higher energy, is present within a "short" time window. Thus for example a 250 Hz note followed within 200 millisecond by a 350 Hz note of the same amplitude (double the energy) will prevent the 250 Hz note of being heard. These and other brain related effects make the "hearing threshold" measured with pure tones in a noiseless booth with earphones that discard the amplification effects of the ear pinna, less of an objective measurement of hearing loss. Consequently we maintain that the "threshold of hearing" should not be measured with pure tones only but with complex Ringtones that include in addition to the fundamental notes also several of their harmonics. As the hearing mechanism is energy cumulative, the loudness of the complex notes for testing the "hearing threshold" should at least be 200 msec long.

Therefore the different "thresholds of hearing" should be measured in the field and stored for use in these very different situations.

We foresee at least 5 different "thresholds of hearing" for each ear: when the sound is coming from the front, from a side or from all around the person, from earphones or from a cellphone juxtaposed to the ear. Consequently at least 10 "hearing thresholds" should be measured, stored and used as a base for amplification in similar situations.

Measuring the hearing threshold with the cellular phone is beneficial not only for oneself for correcting incoming calls, before reaching the ears, but may also be used for correcting outgoing calls, given the threshold of hearing of the receiving party. The threshold of hearing may be measured and recorded either by oneself or from remote through a Q&A session for finding the hearing threshold of the party at the other end of the line. Thus, when transmitting a call, the specific correction needed for the receiving party to better understand the call, can be inserted into the transmission. Consequently, the "Hearing correction" should figure side by side with the cellphone number of a party if this person is interested to receive calls better suited to his hearing quality.

In a preferred embodiment the Hearing Eyeglasses components embedded in each of the eyeglasses temples include a Codec, a Microcontroller, a DSP, a large Flash memory, a Bluetooth RF transceiver, a rechargeable battery, an efficient receiver, 3 microphones and several MEMS sensors, all commercial off-the-shelf components. The microcontrollers situated in the temples may communicate between them by NFC (Near Field Communication) or by wire embedded in the temples of the eyeglasses or by a loose micro-cable connecting the back tips of the temples.

The main modes of operation are "Speech" and "Surround sound" which are further divided into "Noisy" or "Quiet" selections and further depending on the size of the space where the sound source and the "hearing" person are located. In addition some specific sources of sound may be selected, in order to optimize the characteristics of the "sound source" to those of the user's hearing impairment. Such specific "sound source" selections may for example include close family members with whom the user has frequent conversations. Their voice signatures may be recorded and stored for use in preferential processing of their calls. Voice signatures that are useful for making incoming calls more intelligible comprise, the adjustment of the dynamic range of the largely logarithmic compression of speech and accentuation of certain frequencies. These and other features may be analyzed given previous calls of certain frequent callers, such as family members, and preferential features specific to the caller such as amplification of certain frequency bands and optimal loudness range may be stored and applied when calls from said persons are received.

4 microphones "around" the head are used to determine the direction of the "Sound source" in a "Noisy" environment. Fast cross-correlations between pairs of 4 microphones determine the relative"LEAD" or "LAG" of the sound waves; in other words the differences in the time of arrival of the sound to the microphones. For example a maximal cross-correlation of (1) or (-1) means that the sound source is located on a plane perpendicular to the line connecting the two microphones. This is the case of a one-on-one frontal conversation. In this case the audio levels detected by both microphones are equal, while the volume is inverse proportional to the square of the distance. However the cross-correlations between the front and back microphones will "LEAD" or "LAG" depending on their relative locations "LEAD" or "LAG" will determine the "altitude" of the source of sound relative to the plane determined by the four microphones around the head.

In the "Surround Sound" mode which is applicable when Listening to music at home or in a concert hall, the "pause" period is not only harder to automatically define, but it is also wrong as in a "pause" period, noise made by the crowd, may increase. In this case a user signaling is required, by activating one of the external signaling devices mentioned above, in order to define "noise" only when the user thinks it to be proper.

Two LED illuminators placed on the front of the temples and activated by a "touch" sensor, are directed forward and illuminate a limited area in front of the eyeglasses; they serve several purposes in dark areas and may be used for example to illuminate the scene being photographed by the eyeglasses camera or to read in the dark, whether in an airplane or in bed or for indicating the eyeglasses location by generating an audio code, for example when triggered by a proper whistle or ringtone. One of the LED illuminators may be in the NIR wavelength for illuminating a scene being photographed in the dark, without drawing attention.

The large flash memory connected to the microcontroller allows to record and store all the available programs that may be implemented depending the situation and place where the Hearing Eyeglasses are utilized to improve hearing. It may also be used to store conversations whether face-to-face or through the cellphone or store Audio programs detected by the FM receiver. The two 3-axis gyroscopes on the temples, sense the mutual positions of the eyeglasses temples and shut the battery whenever the eyeglasses are posed horizontally with the temples crossed over the frames.

In the "sleep" mode a limited number of components on the eyeglasses wake-up periodically for a short time and listen for short external coded signals. In the case that a properly coded audio or wireless signal is received and authenticated, the hearing eyeglasses emits a sound signal and a flashing light by a LED. These signals help find the location of misplaced eyeglasses. The search signal may also be a proprietary whistle, previously recorded, digitized and stored in the memory.

BRIEF DESCRIPTION OF THE DRAWINGS

FIG. 1 illustrates a cellphone communicating with components of a hearing aid embedded on the temples of a pair of eyeglasses.

FIG. 1a illustrates a tone band extending from 122 Hz to 250 Hz and comprising 8 tones at 16 Hz apart each from the other.

FIG. 1b illustrates a complex ringtone including a fundamental frequency and 3 harmonics of same energy that may be emitted by the cellphone of the hearing impaired person for determining his hearing threshold.

FIG. 1c illustrates a pair of audio receivers, one receiver for eliminating the sounds that reach the ear, by emitting the same sounds in antiphase and the second receiver for delivering the processed and corrected speech the hearing impaired person's ear canal.

FIG. 2 illustrates a cellphone communicating with components embedded on one of the temples of eyeglasses whose optical lenses or sun glasses may be attached to the frame with clips.

The cellphone may have an add-on back-plate incorporating a speaker with wider audio bandwith and power, than the small speakers incorporated in original cell-phones, thus enabling to measure the hearing threshold while keeping the cellphone at arm's length distance. A hardware stereo equalizer connected to the microphone output of the cellphone and powered by an external battery may be connected both to the pair of earphones and the external speaker that has a wider bandwidth for correcting the volume of speech delivered to the hearing impaired person, after determining his hearing threshold.

FIG. 3 is a block diagram showing the functions of the main components embedded in the eyeglasses temples and their interconnections.

FIG. 4a illustrates the positions of the microphones on the temples of the eyeglasses.

FIG. 4b illustrates the positions of the microphones that detect the user's own voice and the limits of the "Listening Elliptical Cone".

FIG. 4c illustrates the "Listening Elliptical Cone" that may be set by the Hearing Eyeglasses user FIG. 5 illustrates the reverberation of speech and the time delays of the echo detected by the various microphones.

Figure 6:
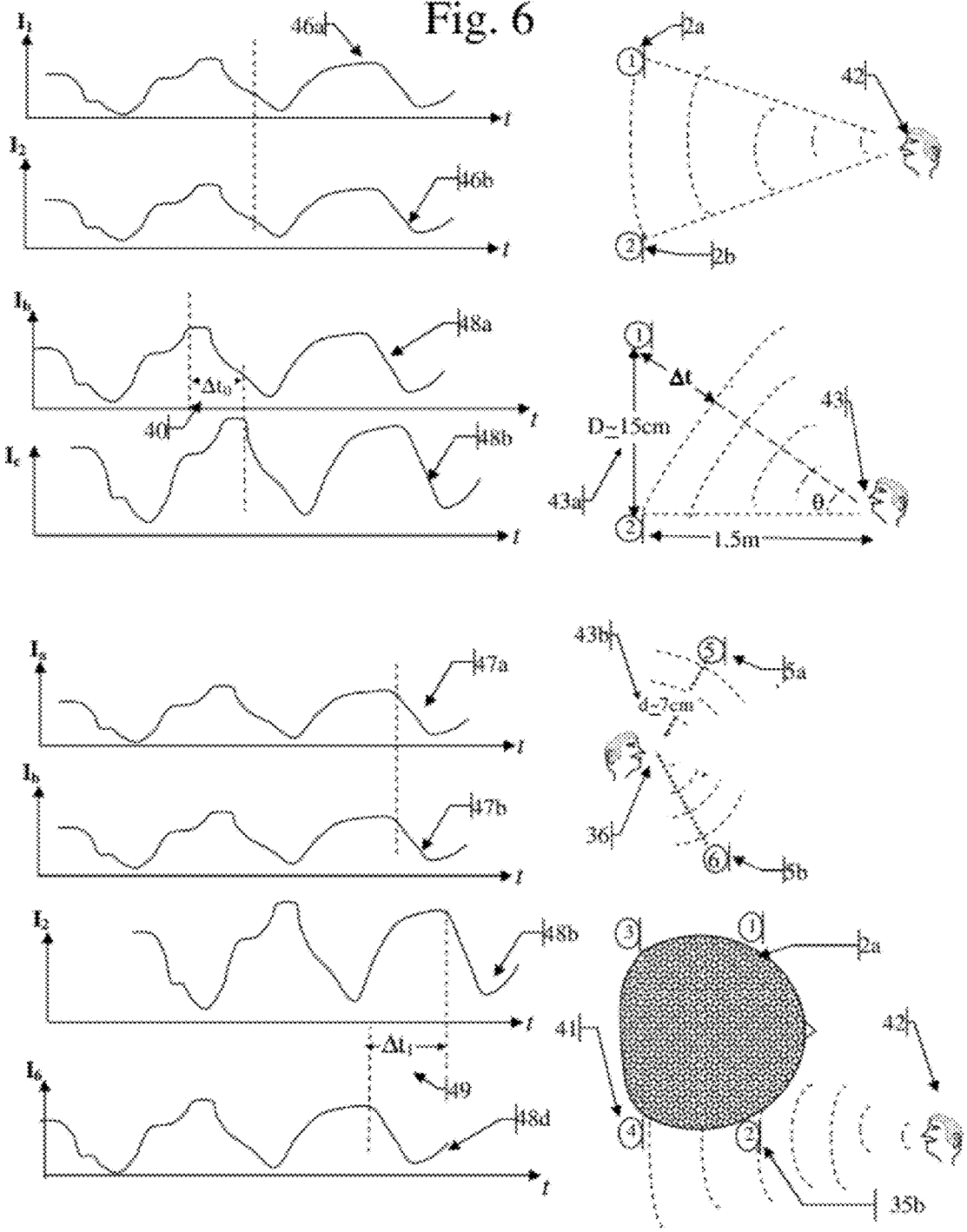

FIG. 6 illustrates the phase delays between sound waves reaching the microphones situated at the front and back of the temples of the eyeglasses.

Figure 7:
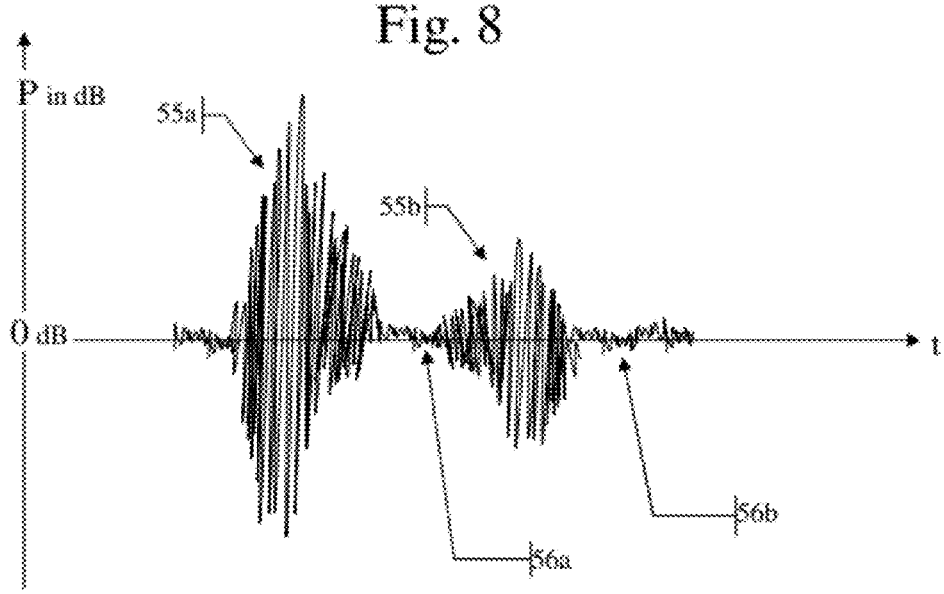

FIG. 7 illustrates the determination of the direction of the sound wave as a function of the cross-correlation between pairs of microphones and the relative sound volumes sensed by the same microphones.

Figure 8:
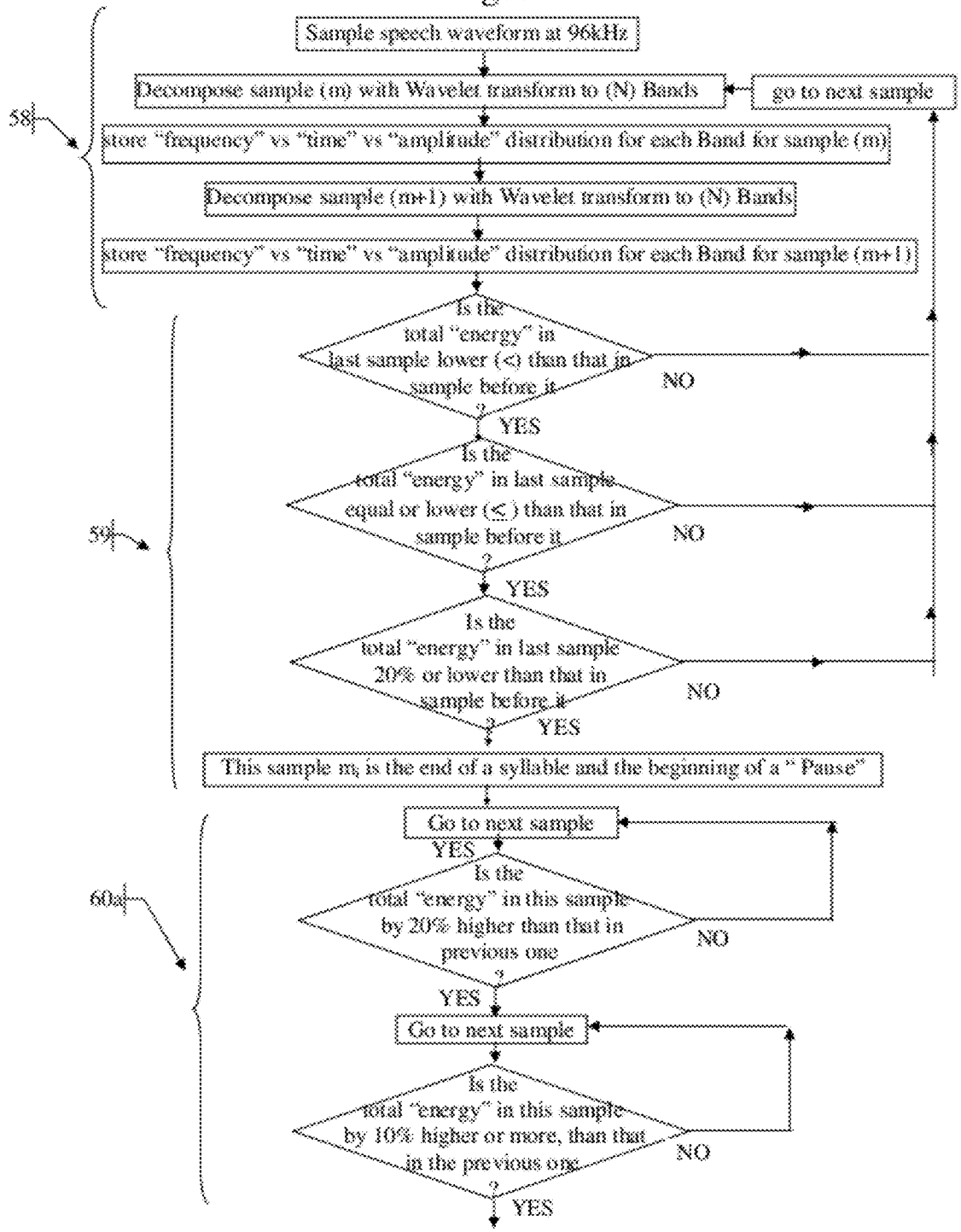

FIG. 8 illustrates the sound pressure waves generated by a talking person including the pauses between syllables or between words.

Figure 9:
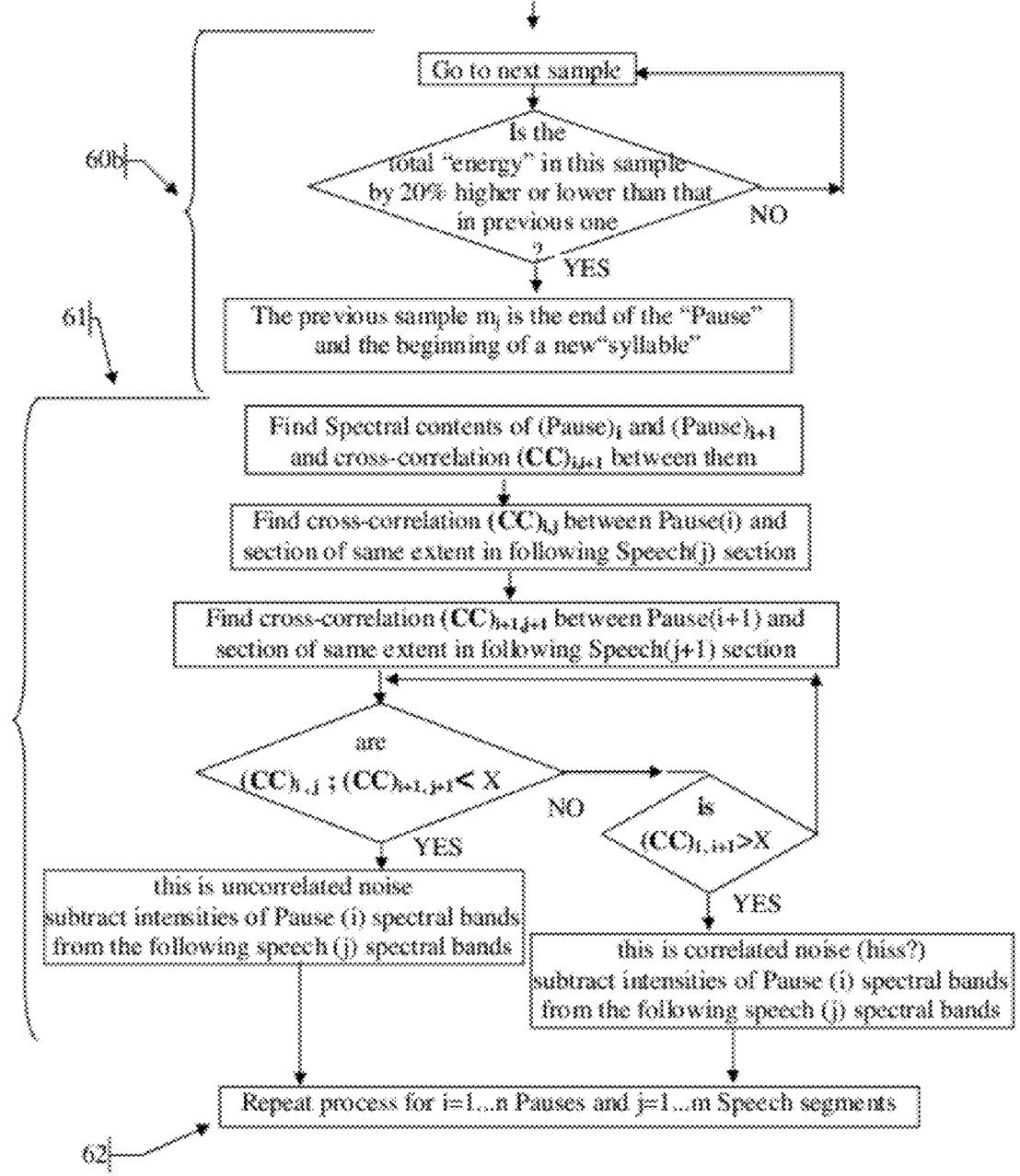

FIG. 9 depicts the main blocks of an algorithm that comes to define "noise" and the way to subtract it from speech.

FIG. 10 illustrates the threshold of Hearing of a normal adult and that of a hearing impaired person as measured by a cellphone transmitting complex ringtones.

Figure 10A:
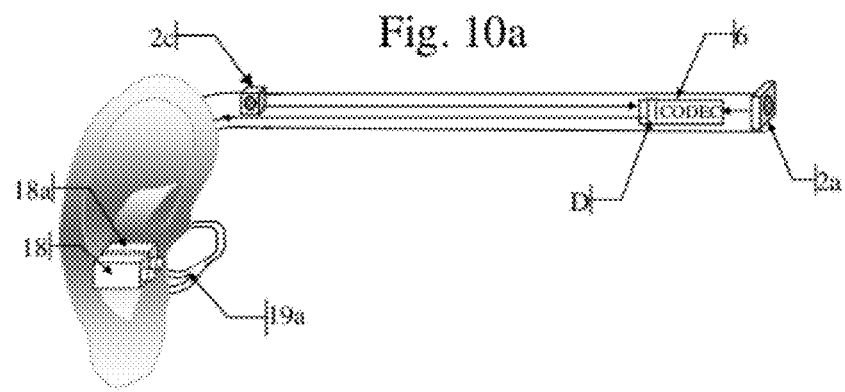

FIG. 10a illustrates the elimination of sound reaching a person's ear by detecting it with a microphone situated close to the ear on the temple of eyeglasses and activating a receiver that sends into the ear canal a sound wave in antiphase of the detected one.

Figure 11:
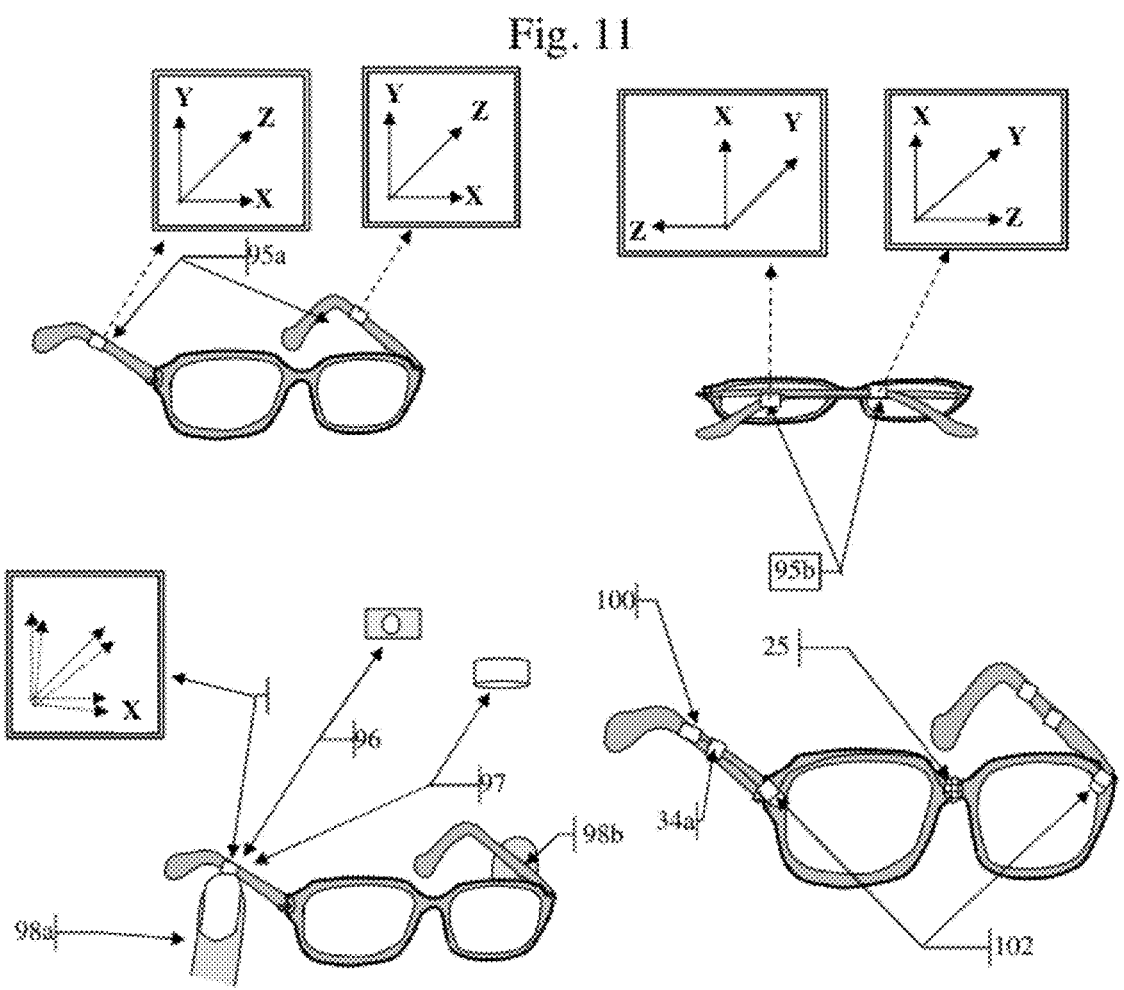

FIG. 11 illustrates the functionalities of the various sensors embedded in the temples of eyeglasses.

Figure 12:
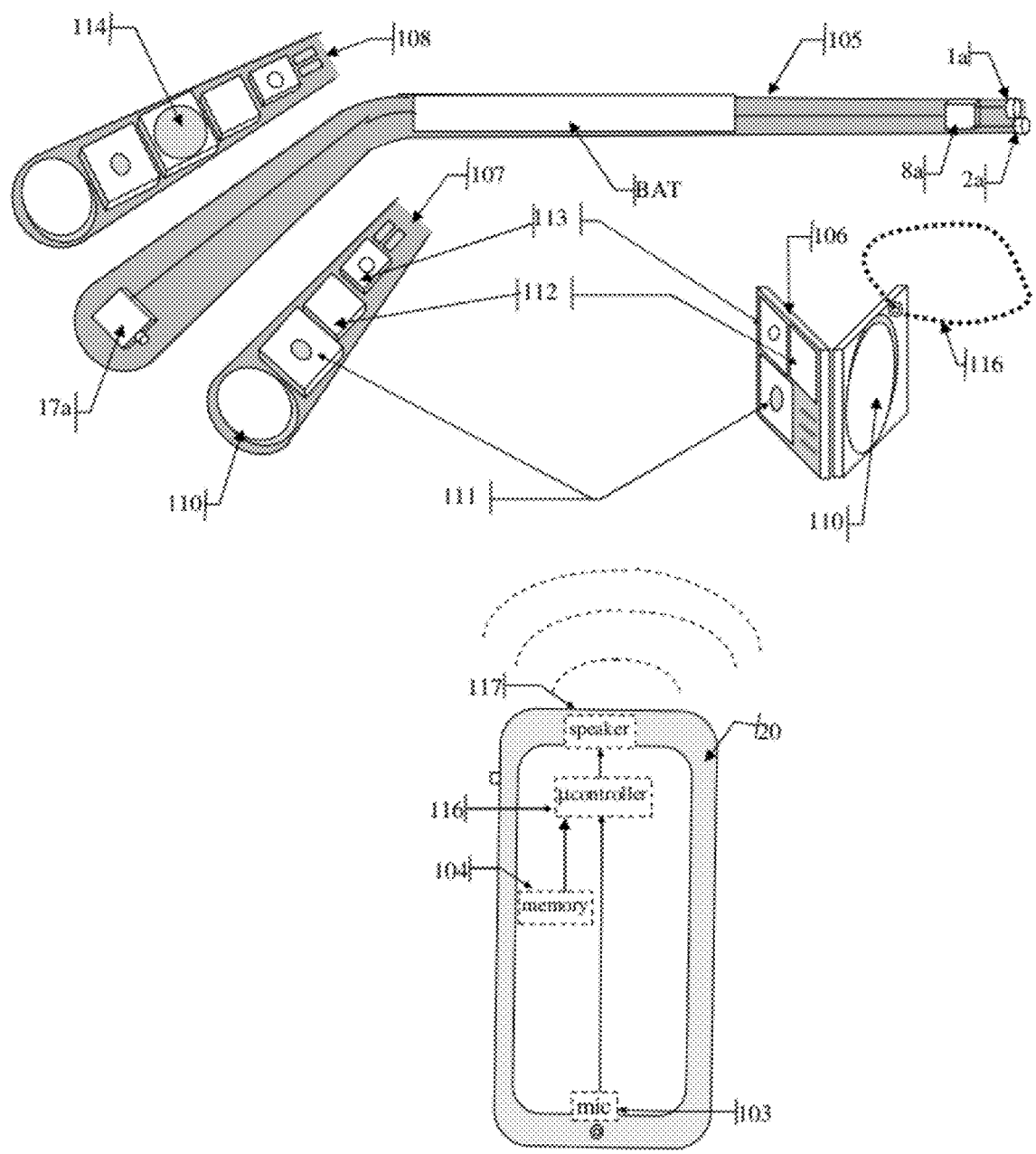

FIG. 12 illustrates a limited version of the Hearing eyeglasses that helps to locate said hearing eyeglasses when lost or misplaced.

Figure 13:
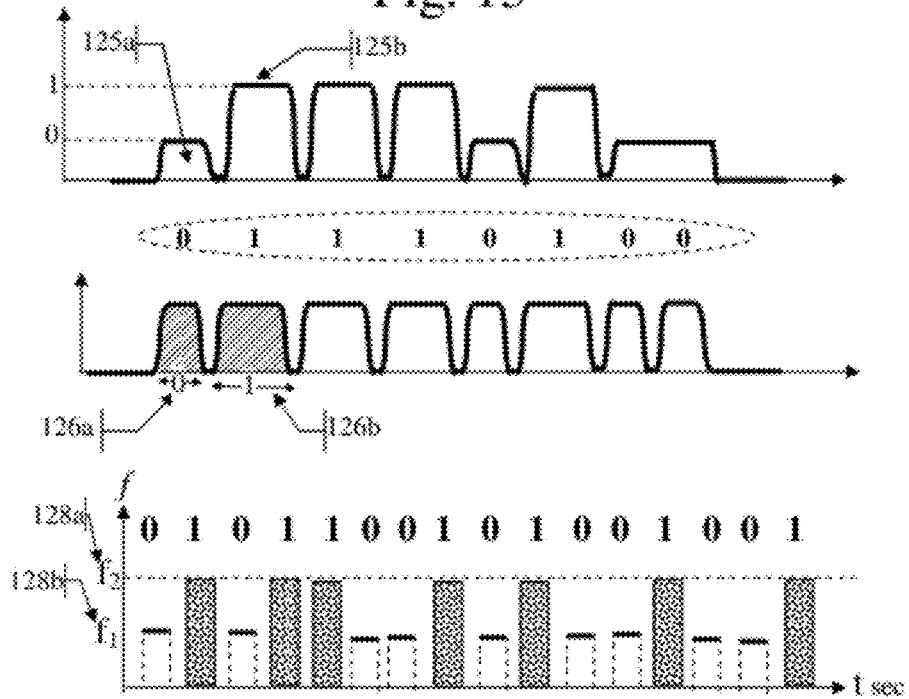

FIG. 13 illustrates several methods of embedding a digital code in ringtones for transmitting commands to the Hearing Eyeglasses by audio.

Figure 14:
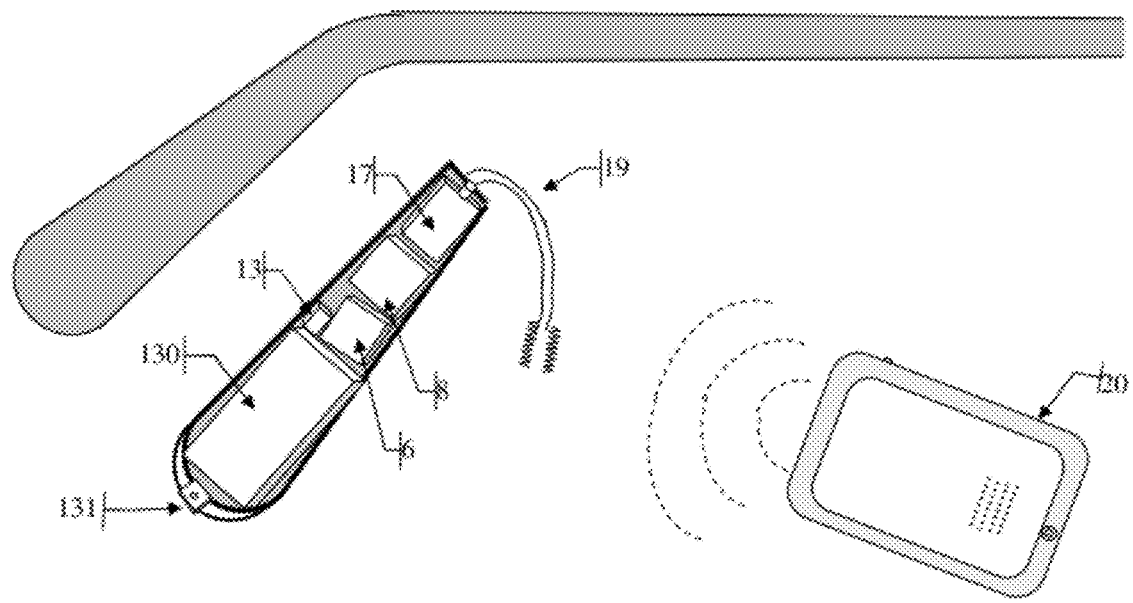

FIG. 14 illustrates a basic Hearing Eyeglasses that may be adhesively appended to the back tip of eyeglasses temples.

Figure 15:
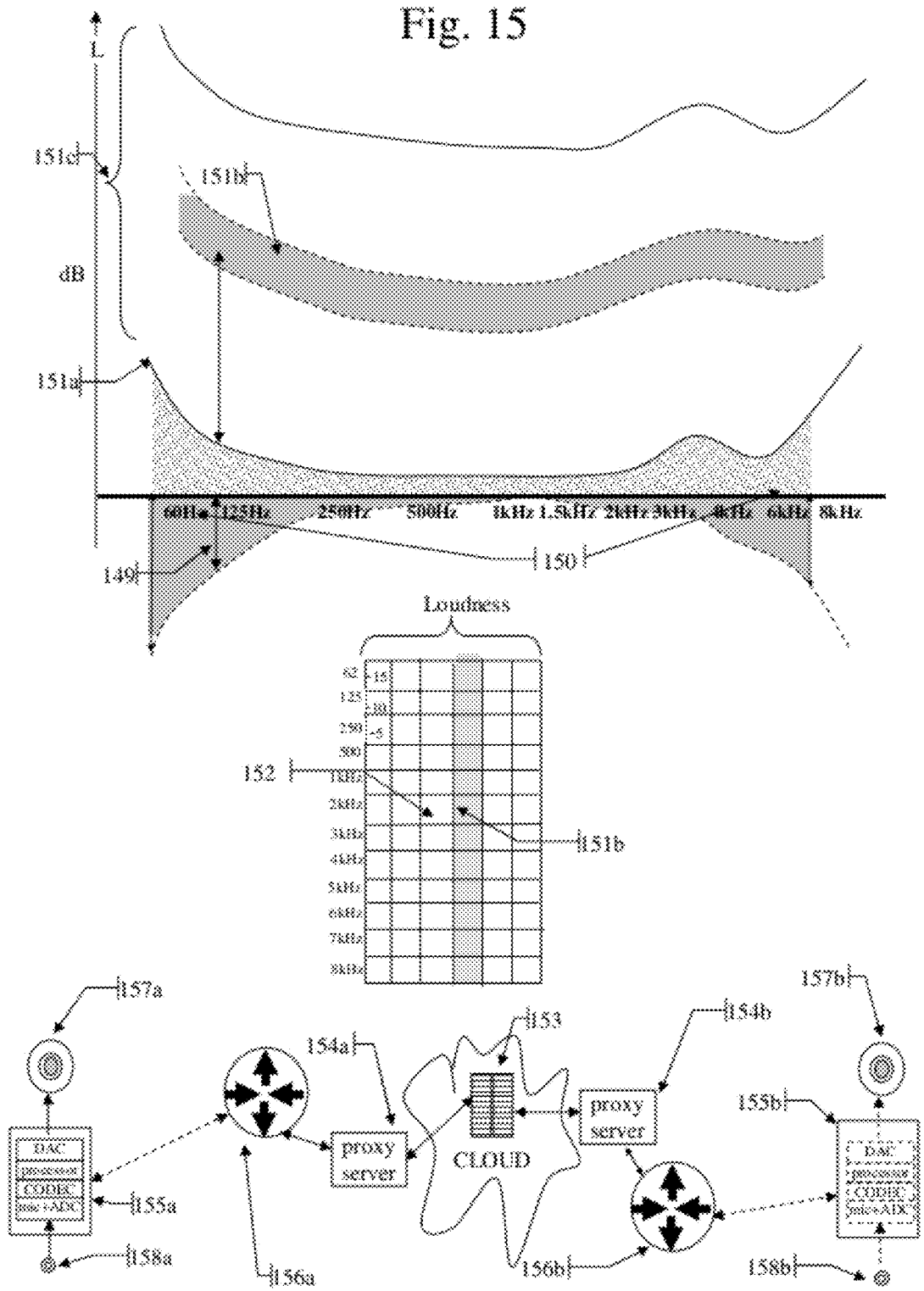

FIG. 15 illustrates the representation of the hearing loss correction in a digital Look-up Table of (6×16) where each element of the matrix is 6-8 bits long and serves to correct incoming calls.

DETAILED DESCRIPTION OF THE PREFERRED EMBODIMENTS

FIG. 1 illustrates a cellphone communicating with components embedded on the temples of the Hearing Eyeglasses.

Each of the temples incorporates a LED $1a$, $1b$, two unidirectional microphones, one on each temple directed forward and two additional directional microphones 5 directed downwards slanted by 45° towards the eyeglasses wearer's mouth. The output of the microphones are connected to CODECs $6a$, $6b$ on each temple for processing the microphone outputs. An RF bluetooth transceiver $7a$ on one temple and an FM receiver $7b$ on the other temple, with their respective antennas and NFC transceivers $11a$, $11b$ manage communications between the temples. and the outside world Microcontrollers $8a$, $8b$ control the traffic on the temples of the eyeglasses, and DSPs $9a$, $9b$ with associated large memories $10a$, $10b$ process the algorithms that reduce noise, determine the proper amplification of different frequency bands.

The 3D direction sensors (gyroscope) $12a$, $12b$ serve to shut-off power when the hearing eyeglasses are not worn. "tap" sensors $13a$, $13b$ which may be vibration sensors or microphones, serve to convey instructions interpreted by the microcontrollers USB type B ports $14a$, $14b$ serve to connect outside devices to the system, while capacitive touch switches $15a$ $15b$ serve to turn on and off the whole system, An electrical cord CH serves to charge the rechargeable batteries BAT a and BAT b.

Omnidirectional microphones $2c$ and $2d$ detect sounds coming from the back and right or left respectively. Potentiometers $16a$ and $16b$ enable to change manually the volume of the respective receivers $17a$ and $17b$.

The microcontrollers $8a$ and $8b$ embedded in the two temples may communicate either by wireless RF using NFC (Near Field Communication) transceivers $11a$ and $11b$ operating at 13.56 MHz, or by wire embedded in the rim of the frame $26a$ or hanging between the ends of the temples $26b$.

Each of the temples has a thin balanced armature receiver $17a$ emitting the frequency modified analog sounds converted by the respective DACs of the CODECs $6a$, $6b$. Thin tubes $19a$, $19b$ carry the sound from the receiver to the ear lobe(s) and therefrom to the respective ear canals. The end of the tube may be covered by bellow like hollow tube $19c$ made from soft foamy material and helps the tube stay in the ear canal without undue pressure. The tube is skin colored and coated with quarter wavelength coats at 3 wavelengths in order to minimize reflections at all times of the day.

A magnetic induction sensor, a Telecoil 3 connects to the codec's amplifier and can communicate with magnetic induction transceiver on the cellphone that are also installed in many public places. An alternative to the rechargeable batteries as a power source are several zinc-air high capacity, model 675 button cell batteries that may also be used as back-up power sources.

FIG. $1a$ illustrates a band of notes composed of 8 notes between 125 Hz and 250 Hz. Determining the hearing profile with bands of notes is more realistic than determining it with pure tones of single frequency and then assigning the result to the entire range of frequencies in the band. This is specifically wrong at the low and high frequencies where the hearing loss is more prevalent and where the masking of one tone by an adjacent tone may misrepresent the facts. Hearing loss measured with Bands of slightly changing tones gives a better representation of the facts; such bands may be built using software for constructing ringtones and prestored in the memory of the cellphone; thus the hearing test may be done with such ringtones of multi-tone FIG. 1b illustrates a complex ringtone including a fundamental frequency and 3 harmonics of the same energy 2 that may be emitted by the cellphone of the hearing impaired person for determining his hearing threshold. Hearing test ought to be repeated with complex tones that incorporate harmonics of the fundamental tone, to assess the potency of the brain in substituting harmonics where the fundamental note is not heard.

FIG. 1c illustrates 2 balanced armature receivers, 18a, 18b, one for canceling the sound arriving through free air and the second for emitting the electronically processed speech detected by the directional microphones 2a, 2b on the temples. The canceling of the sound arriving through free air is done by detecting the sound wave with either of the microphones 2a or 2c and after proper amplification and inverting it sending it to the balanced armature receiver.

The instructions to the Hearing Eyeglasses embedded on the eyeglasses temples are transmitted by a cellphone 20 either by audio ringtones or by the RF transmitter of the cellphone such as a bluetooth transceiver The downward looking unidirectional microphones 5a and 5b are slanted at an angle of approximately +45° and −45° respectively towards the mouth of the speaker. They too are buried inside the temples, their air entry tubes within a tubular hole open to the outside. This structure enhances the directionality of this forward looking microphones. Both microphones have built-in preamplifiers and are connected to the nonlinear amplifiers residing in the CODECs 6a and 6b; they get their power through the LDO regulators residing in the CODECs.

The Frame of the eyeglasses may also hold a Camera 25. The camera may be used to take the picture of a person with whom the eyeglasses wearer is having a conversation which may be recorded.

The front tips of the temples may also hold LEDs 1a and 1b for illuminating objects in front of the eyeglasses. The LEDs may be White light emitting LEDs used for facilitating reading in the dark or NIR LEDS for illuminating objects being photographed in the dark.

The Camera and the LEDs are controlled and activated by the "Tap" detector, using specific Tap codes.

FIG. 1a illustrates a band of tones composed of 8 tones between 125 Hz and 250 Hz. Measuring the hearing threshold with bands of tones is more realistic than measuring the hearing response with pure tones and attributing the hearing response to the entire range of frequencies between these pure tones. Bands of frequencies may be generated ahead of time, for example using software for generating Ringtones and pre-stored for later use when measuring the Hearing profile of a person.

FIG. 1b illustrates a complex ringtone including a fundamental frequency and 3 harmonics of the same energy 2 that may be emitted by the cellphone of the hearing impaired person, for determining his hearing threshold.

FIG. 1c illustrates a pair of audio receivers, one receiver for eliminating the sounds that reach the ear, by emitting the same sounds in antiphase and the second receiver for delivering the processed and corrected speech the hearing impaired person's ear canal.

FIG. 2 illustrates a cellphone that can record the threshold of hearing of an individual by emitting a series of Complex Ringtones of declining loudnesses 21c. The software to generate a Ringtone which is a string of different notes, may be generated by any cellphone using its tone generator. A ringtone may be generated by entering through a keyboard the code that generates the ringtone, for example using the Ring Tones Text Transfer Language (RTTTL) for NOKIA cellphones. The RTTTL code enables to specify the note, the octave and the duration of the note or a pause. Alternatively the string of Ringtones may be generated in any computer and downloaded onto the cell-phone.

As mentioned above, the sound waves emitted by a person or another sound source, are modified both spectrally and in respective loudnesses on their way to a person's tympanic membrane in the ear. Therefore the electronic correction to a person's hearing threshold has to take into account all the modifications done externally. Hearing through the cellphone speaker juxtaposed to the ear, hearing through earphones, hearing a person in front of you or hearing surround music are all different situations; the spectral and loudness hearing thresholds are different. It is important to realize that the Hearing aid itself changes the hearing threshold. It is also important to realize that a person wearing a hearing aid, also hears the sounds reaching his ear directly through the air; it is the combination of the two he is hearing. Therefore the hearing aid has to correct the combination of the two. Measuring "a" threshold in a booth and devising a correction accordingly, has no practical value. In real life situations the needed corrections are different.

It is therefore necessary to measure many hearing thresholds and devise different corrections for each situation.

At least, 5 Hearing thresholds for each ear, 10 in total, when the other ear is hermetically plugged, have to be recorded. 3 of the thresholds are for situations where direct sound reaches the ear, from the front, from the side and from all around. The other 2 Hearing thresholds are for Listening to a cell-phone juxtaposed to the ear and for Listening through earphones. Obviously, there are other special situations where the hearing thresholds are influenced by the surroundings and the person's position relative to the source of sound; in such special cases the hearing aid user has to measure his hearing thresholds and store them in the memory of his hearing eyeglasses.

The recording of the Hearing profile consists in activating the cellphone to deliver a set of complex ringtones at varying loudness, while the user indicates after each Ringtone the degree of his Hearing. As there is a continuity in the hearing loss in the frequency domain, the hearing loss is measured at distinct frequencies and interpolated for frequencies in-between the measured ones. In the current invention we prefer to measure the hearing loss by emitting complex sounds composed of "tone bands" FIG. 10, 83a; such bands include a set of frequencies, in order to better reflect the complex ear-brain response. For example if in the classical way of measuring an audiogram the hearing response is measured at 250 Hz and 500 Hz, we measure the hearing loss at a frequency band that comprise 250 Hz, 312 Hz, 375 Hz, 437 Hz and 500 Hz and apply the responses to the entire band. Another way to generate a frequency band, is to prerecord a complex tone of continuously variable frequencies.

The user is guided step by step by instructions residing in the memory of the Hearing Eyeglasses or the Cellphone. He may respond either through his cellphone keyboard or through a coded set of "Taps" on the "Tap" sensor embedded on his eyeglasses. Preferably a set of 8 tones are delivered by the Cellphone. The user is requested to indicate the loudness preferably by 6 gradations, "Don't hear", "Hear", "Comfortable", "Loud", "too loud" and "excessively loud". In a normal person the range of loudnesses may extend to 80 dBs, while hearing impaired people may have a loudness range as low as 40 dB. Adding more levels just confuses the user. However when recording the loudness levels, the user should be presented with a continuum of loudnesses out of which, he would be asked to categorize them in 6 levels several times. The resulting answers are lumped in 6 bands of loudnesses with some latitude. The "hearing profile" may then be displayed on the cellphone's graphical display as a set of curves of loudness versus frequency, starting from the Hearing threshold amplitudes at the different frequencies up to maximal tolerable amplitudes, which collectively represent the dynamic range of the hearing loudnesses of the user.

FIG. 2 illustrates a cellphone 20 with a folding back-plate 20a, carrying at its top a speaker 20c of higher power and larger bandwidth than the internal speaker 20b. It also carries a hardware equalizer 21a and a battery B. This folding accessory is connected 20g to the cellphone's USB port so that the codec's 21 audio output may be connected to the external speaker 20c that protrudes from the cellphone's top, and therefore may be juxtaposed to the ear, when taking a call.

The cellphone includes an internal software equalizer application 21b, that boosts desired frequency bands more than the others and therefore is suitable for correcting the hearing loss, given a look-up table that say which frequency bands to boost or decrease. The external speaker 20c having a larger bandwidth, is better suited both for measuring the hearing profile with Ringtone bands and broadcasting the incoming calls.

The audio output of the codec 21 may also be channeled through the USB port, to a hardware stereo Equalizer 21a, whose output may also be connected to the Speaker 20c and the earphones 20L and 20R as well.

The external equalizer 21a bands also may be set using the cellphone keypad and the USB port or through the serial communications (RS-232) port.

Consequently the "hearing thresholds" when the source is at a distance may be measured with the external speaker 20c which has a wider bandwidth and is louder, while the "Hearing threshold" of the ear proper may be measured with the earphones.

After the "Hearing threshold" is established, it may be displayed on the cellphone's screen.

The needed power may be extracted from the cellphone output by rectifying one of the AC outputs available at the ports or provided by an external battery B depending on the required power. Such an external battery B may be inserted on the back plate 20a.

When the equalizer corrected call is transmitted through the external speaker, the user has to select whether to transmit the right ear corrected version or the left ear corrected version.

FIG. 2c illustrates an eyeglasses half-frame with thin, wire-like temples 24 with wider ends. The basic hearing correcting electronics in each of the temples include the microphones 2a, 5a, 2c, codec 6a, a bluetooth transceiver 7, a microcontroller with a miniDSP 8, a memory 10, a receiver 17 and rechargeable battery 14 that are incorporated in the wide ends of the temples. The optical lenses 24a may be attached to the half-frame with clips.

FIG. 3 is a block diagram showing the functions of the main components embedded in the eyeglasses temples and their interconnections. The main purpose of the Hearing Eyeglasses is to improve "Speech 29 Intelligibility" given the user's Hearing impairment, which mostly is loss of sensitivity at low and high frequencies.

Amplifying the volume of received sound 28, 29 to a comfortable level improves "Speech Intelligibility" somehow, but not the SNR (signal to noise ratio). Amplification has to be selective, specially at frequencies where the sensitivities are lost. This task is dealt by measuring the Hearing profile of the user, his frequency and loudness response, and amplifying received sounds preferentially at the different frequencies. Microphones 2a, 2b, 5a, 5b and 5a, 5b detect ambient sounds while CODECS 6a, 6b digitize them and sample them preferentially at 96 kHz in the time domain DSPs convert the 10 millisecond samples onto the spectral domain either by discrete wavelet transform or by filtering them thru bandpass filters, and amplify selectively the different frequency bands before transforming them back into the time domain. The amplification is non-linear, above the loudness comfort level selected by the Hearing Eyeglasses user. Remains the problem of reducing noise in the sense of all "Unwanted Sounds". This is a tougher task, as there is a gamut of unwanted sounds. First we try to block all sounds other than the sound coming from the direction we are looking at, and also our own voice. This requires a set of microphones all around (6 in our preferred embodiment) and more powerful computing tools, Digital Signal Processors (DSP) 9a, 9b, in order to calculate the cross-correlations between the detected signals and thus determining the average direction of the sound. Here we have a major problem, how to differentiate "Speech" we want to hear coming from a given Direction and Music (in a room or in a concert hall) that comes from all directions. In our preferred embodiment, we resolve this quandery by letting the user select whether he wants to hear "surround sound" or "directional speech" in his "Listening elliptical Cone". He signals his preferences by coded "tap"s on "sensors" 13a, 13b included in the system. Still remains the problem of "noise" or "unwanted sounds" coming from the direction we want to listen to. We resolve this problem by noting that "Speech" is intermittent while "noise" is generally continuous although it may be variable. We also note that while Speech comes in staccato, discrete syllables and words, "Noise" is more continuous. We therefore identify "pauses" in "speech", measure "noise" during said "pauses" and subtract said "noise" from immediately following "speech" segment. This and other algorithms are stored in a flash memories 10a, 10b and the calculations are done using the embedded powerful DSPs 9a, 9b. "Speech Intelligibility" is improved if the voice signature of the person one is talking to is known; in this case the Hearing Eyeglasses's spectral amplification may be tuned to fit the characteristic frequency spectrum of the person one is talking to. The large memories 10a, 10b store a program that analyses a person's voice and stores this person's characteristic voice spectrum. The user when talking with a specific person, can select his interlocutor and preferentially amplify the specific frequencies characteristic of said person, thus improving "Speech intelligibility".

The Hearing experience is often improved by detecting directly the TV, RADIO or CD frequencies, and converting them to sound after applying the personal hearing corrections, instead of Listening to the audio generated by these appliances and processing said audio by the Hearing Eyeglasses. The major reason for such preference is the conflicting audio levels with other listeners to these appliances. As many of these appliances have FM transmitters, the Hearing Eyeglasses also includes an FM receiver 7a that may be tuned to the desired frequency, using a cellphone or a combination of "Tap" sensors.

Two Microcontrollers 8a, 8b on the temples authenticate the instructions received from external sources by wireless 7, 7a or embedded sensors 12a, 12b, 13a, 13b and relay said instructions to the various components of the Hearing Eyeglasses. The two microcontrollers on the two temples continuously intercommunicate either by wire 26a, 26b or by NFC (Near Field Communications) 11a, 11b and control the traffic between the different components.

FIG. 4a illustrates the positions of the microphones on the temples of the eyeglasses. As explained above in conjunction with FIG. 2, two unidirectional microphones 2a, 2b are placed in the front of the temples, directed forward; two unidirectional microphones 5a, 5b directed towards the users mouth 33 and two omnidirectional microphones 2c, 2d at the back of the temples at positions not hidden by the ears of the eyeglasses wearing person. The two omnidirectional microphones 2c, 2d serve also to continually gauge the levels of the sound reaching the user's left and right ears, directly through free air, and thus help adjust the amplification of the corrective signals delivered into the ear canal through the thin tube connected to the receivers 17a, 17b.

In addition, all speech segments showing high correlation are compared with the user's prerecorded voice spectral signature. High correlation between the spectral content of the sounds detected by the 4 microphones and high correlation with the prerecorded Eyeglass wearer's voice confirms the identity of the "talker". These sounds are then discarded and eliminated from further processing, thus preventing them from reaching the receivers that transmit speech to the user's ears. Nonetheless as the wearer of the Hearing eyeglasses does not have his ears occluded, he still hears his own voice that travelled through the ambient air.

FIG. 4b illustrates the positions of the unidirectional microphones 5a and 5b that detect the user's own voice. The two microphones are positioned at the front end of each temple, where the temple is joined by a hinge to the eyeglasses holding frame, and directed downwards, slanted in the direction of the mouth 33 of the eyeglasses wearing person. As the distances from the mouth to the two microphones 5a, 5b are the same, the cross-correlation between the speech segments detected by these microphones will show a very high correlation close to 100%. The cross-correlations between the directional microphones 2a, 2b looking forward show the phase delays between the fronts of the sound waves detected by said microphones. If the sound source is along the line perpendicular to the line connecting the two microphones, the distances to the microphones being the same, there is no phase difference between the sound waves reaching said microphones. For example as illustrated in FIG. 4b when the sound source is at distances $d_c$ and $d_d$ from the 2 microphones respectively, and $d_c=d_d=60$ cm, assuming that the distance between the 2 microphones is 15 cm, the angle $\theta_1$ between the two wavefronts is 14.36°. If the source of sound 36 is situated in front of one of the microphones at $d_e=59.53$ cm and $d_f=61.4$ the angle between the 2 wavefronts $\theta_2=14.14°$ and the difference in path length $d_f-d_i=1.87$ cm. Furthermore if the source of sound 35b is 15 cm aside then the angle between the 2 wavefronts leading to the two microphones decreases to $\theta_3=9.9°$ and the phase difference increases to 9.7 cm. In an extreme situation when the source is on the same line of the two microphones the two wavefronts are on the same direction $\theta=0°$ and the phase difference is the distance between the two microphones, 15 cm. Thus the way to control the width "H" of the "Listening Elliptical Cone" is by setting a lower range limit on the phase differences; for example setting a limit of no higher than 3.4 cm which is equivalent to 100 μsec (or the duration of 5 samples when speech is sampled at 48 kHz) will ensure the acceptance of all sounds coming from the front perpendicular to the line defined by the 2 front microphones. The altitude of the direction of the sound is controlled by setting the maximal phase difference between the front and back microphones. If the phase difference between front and back microphones is set close to zero (for example "V"=0.1 cm) only a thin slice of sound coming directly to the eyeglasses will be accepted. This low vertical aperture is very convenient as the person wishing to listen to sound coming from a higher altitude has to only lift his head and look at this direction, in order to listen to voices coming from there, otherwise thes sounds will be discarded.

FIG. 4b also illustrates that the phase differences don't differentiate between sounds of widely different intensities. The distance between microphones being relatively short (15 to 20 cm), sound sources between 1 m to 3 m from a pair of microphones separated by 20 cm, will differ in intensity as $(1.2/1)^2=1.44/1$ and $(3.2/3)^2=1.14/1$ respectively, illustrating the fact that the ratio of intensities detected by pairs of microphones drops precipitously, the further the distance of the sound the smaller the ratio of their intensities. Thus putting an upper limit on the ratio of intensities effectively limits the distance of the sound source on the horizontal dimension.

On the vertical direction however the ratio of intensities changes very little with distance; if the source of sound is, for example just above the middle of the head, the intensities detected by all 4 microphones, will approximately be the same, as all phase differences too will also be the same. For very low vertical distances the sound has to cross the head, thus effectively limiting the intensities detected by the opposite pairs of microphones.

If the source is just above the head, with a direct view of the microphones the maximal ratios between pairs of microphones will be when the sound source is above one of the pair of microphones 36a and at a distance $D_h$ 36b from the microphones of the opposite pair. Assuming that the source is at 30 cm above one pair of microphones and the distance to the microphones of the opposite pair is $(30^2+20^2)^{1/2}=36$ cm, the ratio of intensities will approximately be $(36^2/30^2)=1.44$. at higher altitudes the ratio will lower. Thus limiting the vertical distance of sound sources comes to limiting the ratio of the combined intensities of opposite pairs of microphones to a range between 1.44 and a lower figure. For example limiting the vertical distance to 1 m means a distance of the opposite pair of microphones of $(1+(0.2)^2)^{1/2}=1.02$ m, the ratio of their intensities will be 1.04.

Consequently the way to limit the vertical distance of sound sources is to set the range of highest and lowest combined intensity ratios between pairs of microphones. As illustrated above putting a limit on the combined intensity ratios to $1.04 \geq I_r \geq 1.44$ amounts to setting the height of the sound source to between 30 cm and 1 m above the line connecting pairs of microphones.

Setting absolute limits to range of combined intensities of pairs of microphones, eliminates loud sounds while preserving a reasonable dynamic range between soft and loud phonemes.

The Hearing Eyeglasses wearer can set the openings of the "Listening Elliptical Cone" by selecting the two parameters (V) and (H) by using the "Tap" sensors embedded in the temples. As further explained in connection with FIG. 12, one of the "Tap" sensors is used to select the desired function and the second one the value of the selection. The selections are accompanied by oral feedback explaining the available options and confirming the selection. Increasing or decreasing the apertures (V,H) of the "Listening Elliptical Cone" would increase or decrease the scope of the, region 35a, 35b containing the desired sources one would like to hear.

FIG. 5 illustrates how Speech uttered by an interlocutor 36 of the Hearing Eyeglasses wearer may reach him directly 37 or be reflected by surrounding walls and still reach the microphones on the eyeglasses 38a, 38b, and 38c. Such reverberation of speech may sometimes be desired, as it "enriches" the original sounds, or undesired as it decreases speech intelligibility depending on the degree of speech impairment of the talker 36.

Direct speech coming from a single source is detected by all four microphones 2a, 2b, 2c, and 2d on the "hearing eyeglasses" 37, within a limited time window of 0.5 mseconds, with specific phase delays between pairs of microphones as illustrated in FIG. 4b. On the other hand, reverberated speech comes from several objects and walls and reach the microphones after one or more reverberations; it seldom arrives to all 4 microphones within the same time window of 0.5 mseconds or at all. Therefore requiring that all cross correlations be within a specific time window may eliminate all reverberations or allow some of them. Changing the upper time limit between specific microphones may allow some reverberations while eliminating others.

In addition, setting a limit on the dynamic range of the intensity of sounds considered for calculating the cross-correlations, will eliminate low intensity reverberations of speech, analysed previously.

FIG. 6 illustrates the time delays between sound waves emitted by a speaker and reaching the microphones situated at the front and back of the two temples of the eyeglasses. When the sound arrives from a source 42 situated between the two front microphones 2a and 2b the detected respective wavefronts 46a and 46b are of the same intensity with no time delays 695 between them. This is the situation of the One-on-One speech.

When the sound arrives from a source 43 situated in front of one of the frontal microphones, said microphone will detect a slightly higher intensity 48b than the other frontal microphone 48a. The sound wavefront 48b will also arrive sooner $\Delta t > 0$ 40 than the wavefront 48a. This is the situation of One-on-Many where sounds may arrive from people sitting on a semi-circle in front of the Hearing Eyeglasses wearer.

When the sound arrives from the front 42, the back microphones 3 and 4 detect less intense 48d wave fronts than the wavefronts 48b detected by the front microphones 2a and 2b and arriving later by $\Delta t_1$ 49.

The relative delays in time of arrival and the respective sound intensities detected when the cross correlations are maximal, determine the directions of the pressure wavefronts.

As illustrated in FIG. 6 when the sound originates from a source 42 situated symmetrically between the two microphones 2a and 2b, the sound waves arrive to the respective microphones at approximately the same time and the pressure waveforms 46a and 46b detected by said microphones are substantially identical. If on the other hand the source 43 is closer to one of the microphones, the sound wavefront will arrive at the closer microphone earlier than at the distant one and will have a higher amplitude. Thus if we calculate the normalized cross correlation between the two waveforms for sequential samples in time, we can find the time lag $\Delta t$ when the cross correlation is maximal and from there the average direction $\theta$ of the beam. A zero time delay means that the sound source is at equal distance from both microphones. If the distance between the microphones is 15 cm, 43a and the source of sound 43 is in front of microphone 2 at a distance of 1.5 m from it, the sound wave will arrive at the other microphone 1 after 23 μsec.

FIG. 7 is a table illustrating the general direction ($\theta \pm 22.5°$) of incoming wavefronts 50 detected by pairs of microphones (2a and 2b), (2a and 2c), (2a and 2d) and (2b and 2d) as illustrated in FIG. 4a, as a function of the time of arrival (Lag or Lead, 51,52,53) and the relative sound Intensities 54 sensed by the same microphones. Obviously one pair of microphones is not sufficient for locating the direction of sound; however the 4 pairs considered supply much redundant information in order to determine the average direction. Ranking the absolute intensities detected by the 4 microphones 1,2,3 and 4 enables to determine the most probable direction. However as the detected intensities at a given point in time do not reflect the peak intensities of speech that widely fluctuate within a short time, the Ranking has to be done at different points in time, when the patterns of sound are comparable. This procedure requires to find, by cross-correlations, the time delays of comparable speech patterns. Once these time delays (LAG or LEAD) are determined, the Ranking of the Intensities of comparable patterns of high cross-correlation will determine the average direction, albeit with some latitude given by the error ranges of the measured intensities.

The quick determination of the direction of speech enables automatic adjustments of the "Listening Elliptical Cone" by switching it from one interlocutor to another during conversational-speech with a group.

FIG. 8 illustrates the sound intensities 55a, 55b generated by a talking person including the pauses 56a, 56b between syllables and words. Pauses take approximately half of a speech duration. Average english word duration is around 250 msecs while "Pauses" between words may be of the same order of magnitude. "Pauses" between syllables are around 50 to 100 msec. Detecting noise during "Pauses" between "speech" periods is explained below in conjunction with FIG. 9.

FIG. 9 depicts the main blocks of an algorithm that comes to define "noise" and the way to subtract it from speech. As mentioned above "noise", is defined as the signal observed during "Pauses" between "Speech" segments. The pressure signal in the time domain, detected by a microphone is auto-correlated to get the energy spectrum and sampled preferably at 96 kHz.

Then using a 2D discrete wavelet transform the samples are decomposed into discrete frequencies as a function of time 58.

Next, the end of a syllable and the beginning of a pause, characterized by several samples in which the speech intensity drops, is determined 59. Then the extent of a pause characterized by several samples in which the energy doesn't change much, is determined 60. This quiet period is defined as a "Pause".

Then the spectra of the "Pause" are compared with that of the following "Speech" and the next "Pause" following the "Speech" section, in order to ensure that the spectra of "Pauses" and "speech" are not correlated 61.

"Pauses" that have a correlation factor more than X=0.2 are discarded and "pause" frequencies that are not correlated with speech are subtracted from frequencies of the following speech section 62.

This process is repeated for every frame if "noise" is fast changing. However if for several frames the noise stays relatively constant, we sample said "noise" only for time to time, like every second first, after 30 seconds after and after several minutes afterwards. Meanwhile we use last determined "noise" for subtracting it from all current "Speech" segments. Speech sections are released after they are cleaned from "noise".

FIG. 10 illustrates the normal adult's hearing threshold 79 and the Hearing threshold 80 of a hearing impaired person measured between 125 Hz to 8 kHz. The difference between the two curves 81 gives the amplification that the Hearing Eyeglasses has to apply at different frequencies for compensating for the hearing loss of a hearing impaired person and a normal person.

As mentioned above, there is much criticism to establishing the Hearing profile in a sound proof booth with pure tones and asking the patient to self grade the loudness of different tones delivered by earphones. Suffices to say that the ear is a threshold organ and modifies incoming sound in many ways. On its way to the tympanic membrane, sound's spectral composition may change, certain wavelengths may resonate or may be amplified differentially, while others may be damped or cause turbulances, all depending on the structure of the ear, its direction and intensity of the incoming sound. FIG. 10 also illustrates the substantial amplification of the high frequencies relative to low frequencies, done by the ear pinna, resulting in a lower sensitivity at low frequencies 83. Therefore when trying to compensate for the hearing impairment it is proper, in general, to amplify low frequency sound more than high frequency ones. However the amount of compensation at the high frequencies is dependent on how deep into the ear canal, the processed sound is delivered.

One of the complaints of people wearing current hearing aids, is that "voices sound different". Therefore the theoretical compensation delineated in amplification curve 82 that illustrates the electronic amplification needed to bring the hearing threshold of a hearing impaired individual to that of a "normal hearing person" usually misses its target.

The goal therefore is to only "compensate" for the hearing impairment in the affected frequencies and NOT change the spectral and loudness composition of utterences and words, specific to various persons.

The last word in this conundrum belongs to the user; he has to decide how much the various frequencies have to be amplified, not only to reach the threshold of hearing 79 but beyond that. The target is to define the non-linear, probably logarithmic, function of amplification. We already know that the ear (and brain) amplify higher frequencies more than low frequencies 82.

The test asking to grade the loudness of the different tones defines a curve of "equal comfortability" loudness as a function of the frequency of complex tones. The emphasis on complex tones is important as the brain plays an important role in "recognizing" words and hearing the harmonics of a tone is an important factor in recognizing a word.

In the first approximation the system reconstructs the loudnesses bands on a logarithmic scale below 85, 86 and above 87, 88 the mid "comfortable level" 84 on a scale of approximately of 40 dB range. The user is then tested again quantitatively to confirm the logarithmic loudness scale of hearing.

In the following stage pairs of short one syllable words beginning or ending with different consonants, such as "most", coast, ghost and "post" that differ by only one frequency 87a, 87b are tested at all loudnesses levels, and the loudness versus frequency function at each curve is corrected 87c, until the best word recognition is obtained.

After a large number of key words are tested the loudness versus frequency curves that are continous and "best fit" mathematically to the tested words, are generated.

When the ear is substantially open a person hears sounds arriving both through ambient air and through the thin tube connected to the Hearing Eyeglasses wearer. Thus even if "noise" is eliminated electronically from the processed sound using the strategies explained above, it still reaches the ear through the free air in the form of acoustic pressure waves. While the subtraction of noise spectral components from speech segments' spectral components is straightforward, subtracting "noise" in electronic format from "Speech+ Noise" in the form of Pressure wavefronts, is impossible. The subtraction in this case has to be done either in pressure waves or in electrical formats.

FIG. 10a illustrates a strategy to suppress all sound coming from outside the ear through the free air by detecting it with the back microphones 2c and 2d and after proper amplification by the associated CODEC 6a, 6b and appropriate dfelay (D) send it back to the second receiver 18b that given its own delay cause the combined delays be 180° and the generated sound be in anti-phase with the sound wave originally detected by the microphone. A thin tube 19a leads the sound wave into the ear canal, where it substantially cancels the sound arriving through the free air; this is in addition to the processed sound also sent through the receiver 18a and thin tube 19 into the ear canal. This strategy requires in practice proper placement of the microphone, proper amplification and proper timing of the sound wave in antiphase; nonetheless it reduces the sound coming from outside appreciably.

Another strategy is to detect the incoming sound with the front microphone 2a and after proper amplification transmit it to the second receiver 18b, thus detecting the sound wave about 0.4 milliseconds earlier than the back microphone 2c. This earlier detection time substantially compensates for the electronic time of processing of the detected sound by the front microphone, its respective CODEC and receiver, chain and helps to better timing of emitting the pressure wave in antiphase.

Still another strategy is to use only one receiver 17b and feed to it both the signal detected by the back microphone 2c, in antiphase and the corrected and amplified signal originating from the front microphone 2a. This requires a very "agile" receiver whose membrane can move very fast, by 180° from one position of the membrane to its antidote, still at the same frequency.

FIG. 11 illustrates the functionalities of the various sensors embedded in the temples. A 3-axis direction sensor, a gyroscope embedded on the temples of the hearing eyeglasses, can detect, when the eyeglasses wearer folds the temples on the frame, something he does when taking his eyeglasses off and puts them in one of his pockets or somewhere else. Detecting when the temples are folded, can trigger automatically another action such as shutting the system and putting all the electronics to deep sleep, thus saving battery power.

This action is detected automatically by checking whether the directions (X,Y,Z) of the temples in space are the same as originally set 95a, 95b. As long as the temples are open their respective positions in space stay the same; only when the temples are shut, one of the directions, Z direction in this example 95b, is reversed, independently what the 3 absolute directions might be. Thus checking if one of the directions has reversed in respect of the second gyroscope, is sufficient to shut or wake up the entire system or initiate some other action.

The 3 axis direction sensor may also be used as a vibration or "Tap" sensor 95c to relay instructions to the microcontroller by "tap"ing on it with a finger 98.

Instructions to the microcontrollers may also be relayed using other sensors. A small microphone 97 may also be used as a "Tap" detector, while a capacitive membrane touch sensor may also relay coded instructions just by slightly touching it.

Instructions relayed to the microcontrollers may use two sensors for example two "Tap" detectors, one to select a subject for example "Listening Elliptical Cone" and the other to select within said subject a command, for example "One tap for 5 mm LEAD of Right over Left" and "Two taps for 1 mm LEAD of UP over HORIZONTAL".

An entire instruction guide as in "voice mail" systems may be devised wherein the number of "Taps" corresponding to certain actions are explained and confirmed by voice prompts.

The sensors may be used to activate the LEDs 102 situated at the front of the temples when needed, for example to illuminate a scene being photographed by the camera 25 embedded in the middle of the eyeglasses frame.

Sensors may be used to activate connection of the embedded bluetooth transceiver with the nearby cellphone's blutooth transceiver and dial to a remote cellphone user in the network. Such a sequence may be initiated by several sensors dialing codes consisting of LETTERS and NUMBERS.

Touch sensors are used to call different preloaded programs when the situation calls for a change in the way speech/noise ratio si maximalized. The following table lists the tools and programs available to the user and the appropriate situation where to use them. As every program consumes power and battery power on the hearing eyeglasses has to be conserved, the user should be carefull not to call additional programs that have little effect on the specific situation one is in. For example in a quiet library, using the "listening cone" to look only to the book in front of the "hearing eyeglasses" wearer is an overkill of the technology.

cellphone that can replay it at his place and find out whether the Hearing Eyeglasses responds or not.

The 4 components needed for this function namely a rechargeable battery 110, a receiver or a buzzer 111, a microcontroller 112 and a microphone 113 may also be packaged in a thin stand-alone package 107 that may be adhesively appended to the back of the extremity of the temple. A LED 114 may also be added to the package making it slightly longer 108. The stand-alone package may also be folded 106 and the compact package may be attached to the tip of the temple by a chain 116. To save power, all the components of the stand alone package may be "asleep" all the time, save the microcontroller that wakes up periodically for several milliseconds and checks whether the microphone hears a signal resembling a coded signal. If the several milliseconds of Listening points to a possibility of a coded signal it listens for a time period equal to twice the length of the code and either authenticates it, in which case it activates the buzzer or if not authenticated goes back to sleep.

FIG. 13 illustrates several audio codes that may be emitted by a cellphone using its tone-generator. One code consists of

| | | | NOISE REDUCTION TOOLS | | | | |
|---|---|---|---|---|---|---|---|
| | | Speech Direction | | Speech | Speech | | FM | Antiphase |
| SITUATIONS | | front | side | Pauses | Recognition | Telecoil | receiver | sound |
| One-on-One | small space | Quiet (Office) | X | | | | | | |
| | | Noisy (Car, Bus) | | X | X | X | | | X |
| | large space | Quiet (Library) | | | X | | | | |
| | | Noisy (Restaurant) | X | | X | | | | X |
| | Open space | Quiet (Park) | | X | | | | | |
| | | Noisy(airplane) | | X | X | | | | X |
| One-on-Many | small space | Quiet (boardroom) | X | | X | X | | | |
| | | Noisy (Classroom) | X | X | X | | | | |
| | Large space | Quiet (Church) | X | | | | X | | |
| | | Noisy (meeting) | | | | | | | |
| | Open Space | Quiet ( | | | | | | | |
| | | Noisy (street) | | | | | | | X |
| music | small space | Quiet (Living room) | | | | | | X | |
| | | Noisy (car) | | | | | | | X |
| | Large space | Quiet (Concert Hall) | | | | X | X | | |
| | | Noisy (Convention) | X | | X | X | X | | X |

FIG. 12, illustrates a way to locate misplaced Hearing Eyeglasses using a cellphone 20 to wake it up and respond either by audio through its speaker 17b or by light using the LED 1a, embedded in the front of the temples. The Cellphone too may be located by its owner by just "whistling" a code that is detected by the cellphone microphone 103; if the "whistle code" is authenticated by comparison with the prestored resident code in the cellphone memory 104, the microcontroller 116 that controls the whole process, directs the speaker 117 to emit a prerecorded ringtone or a message, or dial its position coordinates to another cellphone if it contains a GPS.

The search for the misplaced Hearing eyeglasses, may be initiated by the cellphone 20 that emits a coded Ringtone as illustrated in FIG. 13 and detected by the microphone 2a embedded on the temple. The microphone relays the audio signal to the microcontroller 8a that after authenticating the message instructs the receiver 17a to emit a prerecorded message. This may be just a series of "lips" in case of a misplaced Hearing Eyeglasses at home. The microcontroller may also instruct the LED 1a embedded in the front of the temple to start flashing in order to draw attention. In case that the hearing Eyeglasses are suspected to be left at someone else's home, the Ringtone may be transmitted to this person's a sequence of audio "lips" of same length, where low volume 125a indicates a "zero" and high volume 125b indicates a "one". A variation of this audio code is a sequence of "lips" of same volume but where a "one" 126b is twice the duration of "zero" 126a. Another variation is to differentiate the "One" 128a and the "Zero" 128b by frequency; for example "One" signaling at 500 hz and "Zero" signaling at 5 kHz. This method requires adding to the microphone of the receiving side a "low pass" and a "high pass" filters. Obviously a combination of the above mentioned codes may also be used.

Cellphone ringtones can be used to transmit coded monotonic or polyphonic messages. For example the morse code used in telegraphy may be used to digitize a monotonic sound source and transmit instructions to devices that incorporate microphones. Cellphones may also transmit polyphonic Ringtones coded as the DTMF code used in telephony. A ringtone may be generated by entering through the cellphone keyboard the code that generates the ringtone, for example using the Ring Tones Text Transfer Language (RTTTL). The RTTL code enables to specify the note, the octave and the duration of the note or a pause. Obviously for generating a digital code it is sufficient to generate a sequence composed of a given note of different lengths and pauses as with a morse code. Some cellphones include a "melody/ringtone Composer", a software package that enable to generate a ringtone by using the cellphone keyboard.

Any code if broadcast as a Ringtone and detected by a microphone would be slightly smeared as in addition to the sound waves reaching the microphone directly, sound reflected by nearby objects too would reach the microphone. For example a 10 feet difference in path length translates into a 10 msec difference in time of detection of the sound impulse. Thus if the transmission of the message is by sound, bits would be enlarged in time by several milliseconds, independently of the coding method adopted. Consequently the modulation of the sound source should be at less than 100 Hz approximately.

FIG. 14 illustrates a basic hearing aid that may be adhesively appended to the extremity of the temple of eyeglasses. The "hearing threshold" may be determined as mentioned above with a cellphone 20. The hearing aid includes a MEMS microphone 131 at the tip of the lower extremity of the package connected to a CODEC 6 with a mini DSP, a microcontroller 8, a "Tap" sensor 13, a receiver 17 with a thin tube 19 that guides the sound to the ear canal and a rechargeable battery 130. The Tap sensor may be used for several purposes; for example entering two quick taps followed by a long pause afterwards, before entering a series of quicktaps means a different function than first entering three quick taps followed by a long pause and then a series of quick taps.

FIG. 15 illustrates the amplification needed at frequencies of 50 Kz to 7 kHz 150 which is the bandwidth of phones complying with the G.722.2 standard, to bring the sounds heard by a hearing impaired person with a "hearing threshold" 149 to that of a "normal" person 151a. The hearing threshold as mentioned above may be self measured. The levels and dynamic range 151c of perceived loudnesses may also be measured with a cellphone as explained above in conjunction with FIG. 2.

Consequently the personal loudness levels in SPL dB units, as a function of frequency bands, may be represented in a look-up table 152 that can be stored in diverse devices, from the personal cellphone, to databases hosted in various servers, accessible to the routers, that transport the VoIP packets from the sender to the destination address. Thus the sender's VoIP message may be "corrected" before reaching the destination address.

The "Hearing Look-up table" represents the desired loudness levels in dB units at 16 frequencies, at 6 levels, including, starting from the minimal threshold of hearing 149. The reason we included only 6 levels is that these levels are not only subjective, but are also very hard to quantify, other than saying that one level is higher or lower than the other. The only levels that are easy to quantify is the "Hearing threshold" and the highest level where it is "excessively loud". Thus the range of hearing loudness of a person may be determined by measuring the loudness of the emitted tones through the earphones at these two levels. We then can divide this range into six bands and attribute to these loudness levels the names that the user selected, i.e. "barely hear", "hear", "comfortable", "loud" and "too loud" and "excessively loud" If the total range of hearing is, for example 48 dB on a logarithmic scale, each band would be 8 dB wide. Obviously this is just a convention we selected; the entire range of loudness, however, is real and hearing impaired people have a reduced range of hearing loudnesses.

The hearing loss of a person is expressed in his inability to hear and understand speech. While reduced hearing range may be improved by amplification of all sounds, this solution however doesn't improve the SNR. Consequently restoring the loudness of frequencies that were affected is a way to improve signal amplitudes and subsequently improve SNR.

Audio codecs sample the incoming speech power spectrum and decompose voice samples into their frequency content, either with filters or by FFT. To bring the sender's actual speech level to the hearing impaired person's "comfortable" level, as listed in the "lookup table" two operations are needed.

The first operation is to bring the amplitudes of all frequencies to the level of a normal hearing person. In the look-up table these are listed in the first column under "threshold of hearing" with negative SPL power levels, like (−5 dB) or (−15 dB) for example. This is an additive operation. The second operation is to compute the ratio between the average power level of the received speech sample and that of the "comfortable" level 151b of the hearing impaired person, and multiplying the amplitudes of all the frequencies in the sample (including the first additive step) by said ratio. This operation will bring most frequencies amplitudes within the 3 middle bands without changing their relative amplitude. This equalization of the relative amplitudes of frequencies preserves the individual speech characteristics of a person, the way people sound. The "Hearing Look-up table" 152 that needs less than 1 kbyte of memory can be stored on the cellphone where the audio codec and the microprocessor can perform the needed multiplications in real time before delivering the incoming call to the loudspeaker of the cellphone 157 or landline telephone which hopefully will have a larger bandwidth in the future.

The correction matrices of the network subscribers, once measured, can all be stored in dedicated servers 154a, 154b, or in the "cloud"153.

The personal "Hearing Look-up table" can be associated with a person, notwithstanding which telephone he might be using to take the call. As the personal "Hearing Look-up table" may be self measured in complete privacy, using a cellphone, the user can fine-tune his Look-up table from time to time, at will. Any "Hearing Look-up table" not in the user's personal cellphone or line telephone, may be password protected.

The "Hearing Look-up table" may be complemented by the "Speaker Look-up table" that specifies the range of power levels of the speaker in articulating the various frequencies, as well as other voice signatures that are relevant to intelligibility of his speech.

There are multiple ways to realize the invention explained above, combine the differentiating features illustrated in the accompanying figures, and devise new embodiments of the method described, without departing from the scope and spirit of the present invention. Those skilled in the art will recognize that other embodiments and modifications are possible. While the invention has been described with respect to the preferred embodiments thereof, it will be understood by those skilled in the art that changes may be made in the above constructions and in the foregoing sequences of operation without departing substantially from the scope and spirit of the invention. All such changes, combinations, modifications and variations are intended to be included herein within the scope of the present invention, as defined by the claims. It is accordingly intended that all matter contained in the above description or shown in the accompanying figures be interpreted as illustrative rather than in a limiting sense.

I claim:

1. A cellphone managed hearing eyeglasses, for correcting the hearing loss of people, containing electronic components embedded on eyeglasses frame temples and the cellphone, comprising:

1.1. microphones, codecs, microcontrollers, digital signal processors, speakers, buzzers, means for generating complex tones, and tone bands, RF and inductive transceivers, gyroscopes, tap, capacitive and touch sensors, memories, and
1.2 software programs embedded both on the cellphone and the eyeglasses comprising,
    1.2.1 a software program for managing the measurement of the hearing profile of the hearing impaired person, by himself, using complex tones and tone bands, and
    1.2.2 software programs for noise cancellation comprising,
        1.2.1.1 a program for cancelling sounds arriving from outside a given direction wherein said direction may be changed by the eyeglasses wearing person in real time, and
    1.2.3. software programs for improving intelligibility of words heard and wherein
        1.2.3.1 sound frequencies hitherto badly heard, are selectively amplified, and
        12.3.2 noise between words, syllables and phonemes are subtracted from the following speech components.

2. A cellphone managed hearing eyeglasses as in claim 1 wherein instructions transmitted between the cellphone and the eyeglasses are in the form of one of coded audio tones generated by tone generators and wireless transmissions generated by RF transceivers.

3. A cellphone managed hearing eyeglasses as in claim 1 wherein the user's hearing profile at each of his ears, consisting of his equal loudness contours at frequency bands extending from low to high audio frequencies, are self recorded and stored in both the cellphone and eyeglasses memories, in a process, wherein
    3.1. The user listens to a preset list of, one of tones generated by a cellphone tone generator and prerecorded tone bands, at increasing and decreasing loudness levels, and wherein
        3.1.1. said user indicates his perceived loudness levels heard, at the different audio frequency bands starting at the "don't hear" level up to the "excessively loud" levels and,
        3.1.2. sets the range of the logarithmic scale of sound power heard, to extend from the last "don't hear" level to the "excessively loud" level, and correlates the actual power levels he listened to, with the subjective assessment of said power levels, and wherein
    3.2 incoming calls are corrected by:
        3.2.1 bringing the amplitudes of all frequencies to the levels of a normal hearing person and,
        3.2.2 multiplying the amplitudes of all the frequencies in a speech sample by a ratio between average power level of a received sample and that of a comfortable level of the hearing impaired person, and wherein
        3.2.3 the incoming calls are corrected separately for the hearing impairment of the right and left ears when delivered to a pair of earphones and wherein,
            3.2.3.1 the hearing impaired person can select which of the right ear or left ear corrected version is channeled to the speaker of the cellphone.

4. A cellphone managed hearing eyeglasses as in claim 3 wherein distance between subjectively assessed power levels of different loudnesses is further fine-tuned by,
    4.1. listening to a list of short, one syllable words, differentiated by different beginning or ending consonants, uttered through the speaker at the same loudnesses, as perceived by the subjective assessment process defined in claim 3, and
        4.1.1 updating a perceived actual frequency-loudness curve relative to absolute power levels of the loudspeaker, until the optimal relation that makes such words most differentiated to the user, are reached.

5. A cellphone managed hearing eyeglasses as in claim 1 that differentiates between speech and noise comprising:
    5.1. one or more microphones on each temple, and
    5.2. at least one digital signal processor (DSP) wherein,
        5.2.1 said DSP samples the audio signals detected by said microphones, decomposes said audio samples into their spectral components, computes the cross-correlations between the spectral components of the audio segments detected by said microphones and,
        5.2.1.1 differentiates between "speech" segments whose spectral components have high cross-correlations, and omnidirectional "noise" segments whose spectral components have low cross-correlations, and
        5.2.1.2. eliminates said "noise" segments.

6. A cellphone managed hearing eyeglasses as in claim 5 wherein sounds arriving through free air to the ears are eliminated by a noise cancelling system comprising:
    10.1 microphones on the temples of the eyeglasses, in the vicinity of the eyeglasses wearing person's ears, but not hidden by them, directed onto a direction outward the ear, for detecting sounds arriving in the direction of the ear, and
    10.2 amplifiers residing in the codecs, and controlled by one of the touch and tap sensors on the eyeglasses temples, that properly amplify the microphone detected signal and after a phase delay, relay the amplified and phase delayed signal to a DAC "Digital-to-Analog Converter" of the codec, and
    10.3 a balanced armature receiver on the eyeglasses temple, which further delays said phase delayed signal received from the DAC "Digital-to-Analog Converter" and transforms it into a sound wave, channeled into the ear canal though a fine tube, and wherein
    10.4 the controlled phase delay induced at the codec and the phase delay induced at the balanced armature receiver, together cause that the generated sound wave be at antiphase with the external sound wave that reaches the ear canal.

7. A cellphone managed hearing eyeglasses as in claim 1 comprising means for detecting the direction of incoming sound wherein said means for detecting comprise:
    6.1. at least 4 microphones placed on the temples around the head at approximately same distances each from the other, wherein
        6.1.1 said microphones are not hidden by the ears of the eyeglasses wearing person, and
    6.2. digital signal processors for calculating cross-correlations between sound waves detected by pairs of microphones, and
        6.2.1 means for deriving the relative LAG or LEAD times elapsed between same length sound segments detected by said pairs of microphones when said cross-correlations are maximal, and
    6.3. means for measuring and comparing the relative sound intensities detected by said microphones at respective time points when cross correlations are maximal, and
    6.4. establishing a one-to-one correspondence between the average direction of sound waves and the respective time delays in arrival of said sound waves to the microphones and the maximal sound levels recorded by said microphones at the arrival times of said sound waves.

8. A cellphone managed hearing eyeglasses as in claim 7 comprising means for setting respective vertical and horizontal apertures (V) and (H) of an imaginary "cone" that defines the volume in space that encompasses the sources of sound that are accepted for further electronic processing before relaying them to the speakers that channel them into the ear canal, wherein said means for setting comprise:
- 7.1. one of touch and tap sensors for setting the range of time delays between sound wavefronts reaching the
  - 7.1.1 front-looking unidirectional microphones and,
  - 7.1.2 between each of the front-looking unidirectional microphones and each of omnidirectional microphones on the back, and
- 7.2. one of touch and tap sensors for setting the range of ratios of intensities of detected sound wavefronts between opposite pairs of microphones.

9. A cellphone managed hearing eyeglasses as in claim 7 wherein speech segments are identified as the hearing eyeglasses wearer's own voice and subsequently discarded from further processing, comprising:
- 9.1 two unidirectional microphones situated at the front end of each temple, where the temple is joined by a hinge to the frame holding the glasses, wherein said unidirectional microphones are directed downwards, slanted in the direction of the mouth of the eyeglasses wearing person, and
- 9.2 a digital signal processor for measuring the respective cross-correlations between voice segments detected by said unidirectional microphones and determining the cross-correlation between them, and
  - 9.2.1 measuring cross correlation between said voice segments spectral components and the spectral components of the hearing eyeglasses user's prestored voice and determining the cross-correlation between them, and
- 9.3. determining that said voice is that of the eyeglasses wearer when said cross-correlations are high.

10. A cellphone managed hearing eyeglasses as in claim 1 wherein the "background sound" spectral content is subtracted from Speech segments spectral contents, before being delivered to the user's ear canal, the cellphone speaker and the earphones connected to the cellphone's audio interface, wherein
- 8.1 "background sound" is defined as the sound detected during "pauses" between speech phonemes, syllables and words, wherein
  - 8.1.1 a "pause" is defined as the time interval that starts by a sudden drop in sound volume after speech, and ends by a substantial rise of said sound volume, and wherein the spectral content of sound during said "pause" has low spectral cross-correlations with the spectral content of sounds immediately following said "pause", and wherein
- 8.2 the spectral content and loudness of "background sound" subtracted from any speech segment is the one immediately preceding it.

11. A cellphone managed hearing eyeglasses as in claim 1 wherein sensors embedded in the eyeglasses may be used separately or jointly to dial codes including letters, numbers and "taps" for activating, and
- 11.1. controlling selected programs comprising:
  - 11.1.1 sound direction limiting programs, and
  - 11.1.2 A program for noise measurement during pauses between speech syllables, phonemes and words and its subtraction from the following speech segments, and
  - 11.1.3. speech recognition programs, and
  - 11.1.4. a combination of said programs above, that maximize speech intelligibility in one of, a quiet room, a noisy room, a large quiet space, a large space, an open air quiet space and an open-air noisy space during:
    - 11.1.4.1 one-on-one, conversational speech, and
    - 11.1.4.2 conversational speech with many interlocutors, and
  - 11.1.5. a combination of programs that minimize "background sound" in places where "surround sound" is emitted in one of, a small room, a music hall and an open-air space, and
  - 11.1.6. programs that maximize speech intelligibility of the hearing eyeglasses user, given the voice signatures of the voices of specific interlocutors, and
- 11.2. selecting embedded components for communicating with other components embedded on the eyeglasses and the cellphone, comprising AM and FM transceivers, and
- 11.3. selecting external devices including radios, TVs, cellphones and other devices connectible by RF transceivers, and
- 11.4. telecoils for communicating through inductive couplers.

12. A cellphone managed hearing eyeglasses as in claim 1 wherein the processed sound generated by the Hearing eyeglasses receiver is conducted to the user's ear canal through a thin tube wherein,
- 12.1 said thin tube is skin colored and terminates in a bellow-like flexible hollow tube made of compressible foamy material that holds the tube in the ear canal.

13. A cellphone managed hearing eyeglasses as in claim 1 comprising gyroscopes on both temples and other embedded electronic devices powered by power sources, wherein the power source is shut when the temples of the eyeglasses are folded over the frame.

14. A cellphone managed hearing eyeglasses as in claim 1 that can be located from a distance, by transmitting a coded signal that causes the eyeglasses to respond by one or more of audio, light and a wireless signals wherein, the coded signal is one of
- 14.1 a ringtone emitted by one of a cellphone directly, through another cellphone, a line phone and an audio whistle coded in frequency and loudness.

15. A cellphone managed hearing eyeglasses as in claim 1 for improving the intelligibility of calls from certain frequent callers, comprising
- 17.1 storage of said caller's voice signatures and patterns in the memory wherein
  - 17.1.1. said signatures comprise relative loudnesses of certain speech frequencies over the average loudness of speech samples, wherein
- 17.2 the dynamic range of the received call's loudnesses are equalized to that of the hearing eyeglasses wearer, while speech frequencies accentuations specific to the caller, are selectively amplified as compared to other frequencies, in the same proportion as in the received call.

16. A cellphone managed hearing eyeglasses as in claim 1 for adapting incoming phone calls to hearing impaired users comprising:

18.1 digital signal processors, programmed to change the volume of frequency bands of sounds incoming through the cellphone, using the cellphone software, wherein 18.1.1 said software programs include the reprogramming of the frequency bands of incoming sounds separately for the left and right ears according to the different hearing profiles of each ear dependent on the sound source and direction and wherein, 18.1.2 the outputs of the digital signal processors are connected through digital to analog converters to the right and left earphones, whose spectral audio volumes may be programmed separately, and 18.2 to a loudspeaker appended physically to the cellphone and connected to one of its audio ports, wherein said loudspeaker has a larger bandwidth and power as compared with the internal speaker of the cellphone, and 18.3 the components external to the cell-phone are powered by power derived from the cellphone through its ports.

17. A cellphone managed hearing eyeglasses as in claim 1 wherein the electronic components embedded on the temples are electrically connected by cable or wire embedded in the eyeglasses frame or hanging between the temples tips.

18. A cellphone managed hearing eyeglasses as in claim 1 comprising a camera on the eyeglasses frame and LEDs at the frontal tips of the eyeglasses temples, for illuminating objects in front of the camera, wherein 19.1 the LEDs are one of white light emitting LEDs or NIR LEDS for illuminating objects being photographed in the dark, wherein 19.2 said camera and LEDs are controlled by one of tap detectors and touch sensors on the temples, using specific codes, and wherein 19.3 pictures taken by the camera are stored in the cellphone managed hearing eyeglasses memory.

19. A cellphone managed hearing eyeglasses as in claim 1 comprising at the end of each of its eyeglasses temples, two receivers, wherein 20.1 one receiver for emitting electronically processed speech detected by directional microphones and 20.2 a second receiver for canceling the sound arriving through free air by emitting a sound wave in antiphase with it, wherein 20.2.1 said sound wave in antiphase with the sound wave arriving through free air, is generated following the signal received from a front microphone that precedes the sound wave arriving through free air.

\* \* \* \* \*